US012684525B2

(12) United States Patent
Gomez Martinez et al.

(10) Patent No.: US 12,684,525 B2
(45) Date of Patent: Jul. 14, 2026

(54) USER EQUIPMENT ASSISTED MAPPING OF ACCESS POINTS

(71) Applicant: QUALCOMM Incorporated, San Diego, CA (US)

(72) Inventors: Feliciano Gomez Martinez, Los Gatos, CA (US); Suman Murari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 380 days.

(21) Appl. No.: 18/407,650

(22) Filed: Jan. 9, 2024

(65) Prior Publication Data

US 2025/0227655 A1 Jul. 10, 2025

(51) Int. Cl.
*H04W 64/00* (2009.01)

(52) U.S. Cl.
CPC ................................. *H04W 64/003* (2013.01)

(58) Field of Classification Search
CPC . H04W 64/00; H04W 64/003; H04W 64/006; G01S 5/02; G01S 5/0205; G01S 5/021; G01S 5/0221; G01S 5/0242; G01S 5/0244
See application file for complete search history.

(56) References Cited

U.S. PATENT DOCUMENTS

| | | | | |
|---|---|---|---|---|
| 2023/0309053 A1* | 9/2023 | Kennouche | ......... | H04W 64/003 |
| 2024/0427007 A1* | 12/2024 | Gomez Martinez | .. | G01S 5/0244 |
| 2025/0093458 A1* | 3/2025 | Gomez Martinez | .... | G01S 3/808 |

FOREIGN PATENT DOCUMENTS

| | | | | | |
|---|---|---|---|---|---|
| CN | 105101410 A | * | 11/2015 | .......... | H04W 64/003 |
| EP | 4027164 A1 | * | 7/2022 | .......... | H04W 64/006 |

* cited by examiner

*Primary Examiner* — Siu M Lee
(74) *Attorney, Agent, or Firm* — Weaver Austin Villeneuve & Sampson LLP

(57) ABSTRACT

Techniques are provided for determining the locations of wireless nodes in wireless networks. An example method for determining locations for a plurality of wireless nodes in a wireless network includes determining a location of at least one wireless node in the plurality of wireless nodes, determining one or more distances between pairs of wireless nodes in the plurality of wireless nodes, generating a loss function based on possible locations of each of the plurality of wireless nodes, wherein the loss function has a low value when the possible locations are consistent with the location of the at least one wireless node and the one or more distances between the pairs of wireless nodes, determining a set of location values to minimize the loss function, and outputting a location for each of the plurality of wireless nodes based on the set of location values.

20 Claims, 13 Drawing Sheets

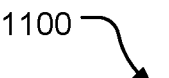

1100

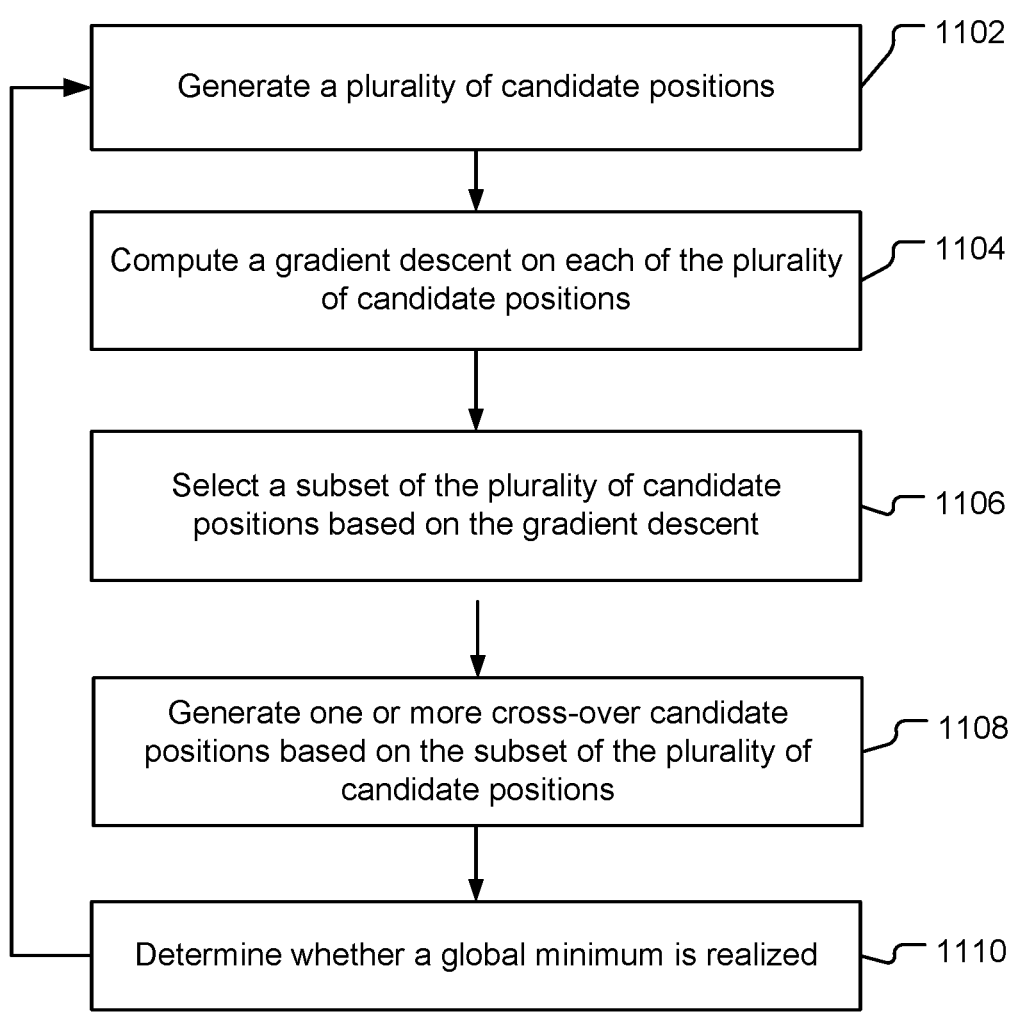

Generate a plurality of candidate positions — 1102

Compute a gradient descent on each of the plurality of candidate positions — 1104

Select a subset of the plurality of candidate positions based on the gradient descent — 1106

Generate one or more cross-over candidate positions based on the subset of the plurality of candidate positions — 1108

Determine whether a global minimum is realized — 1110

*FIG. 11*

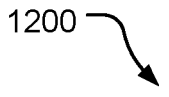

1200

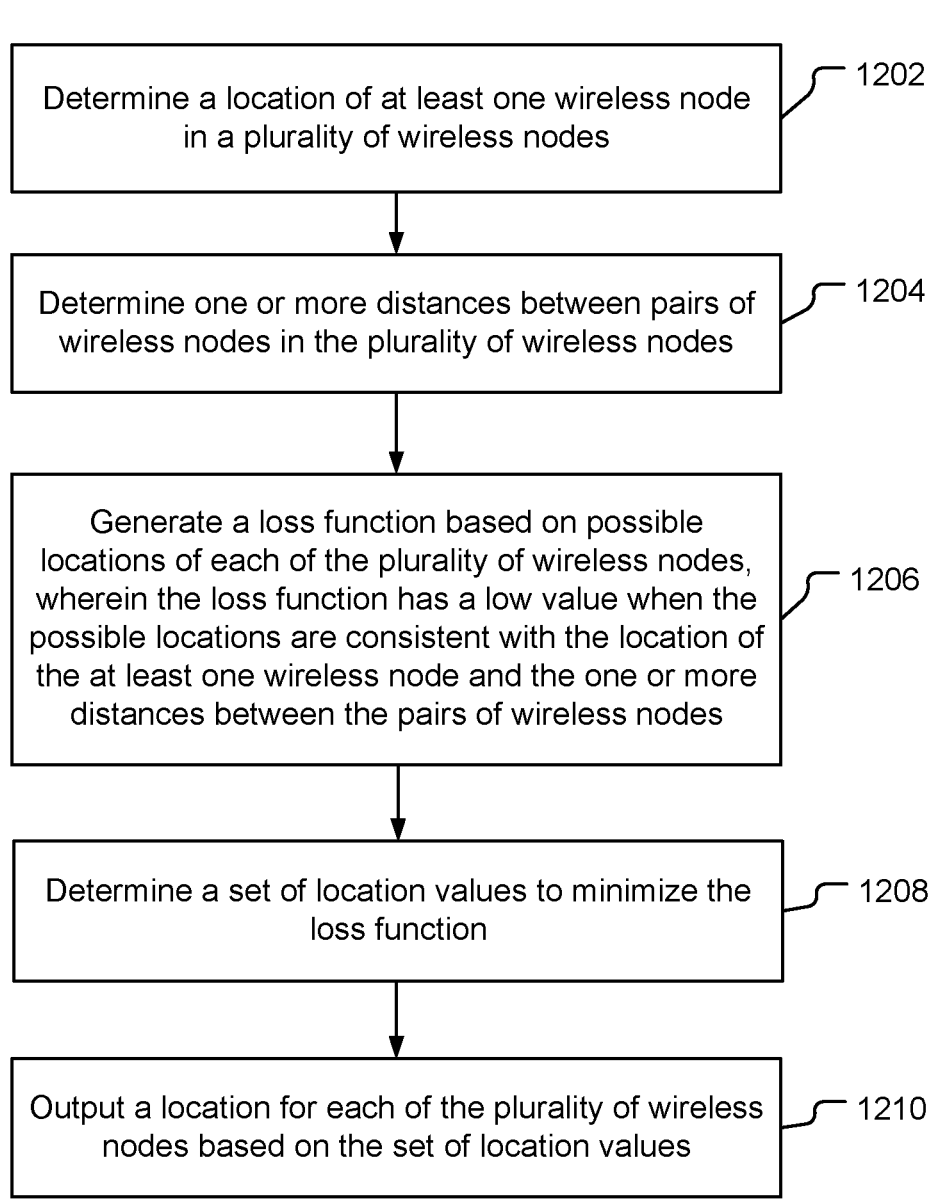

Determine a location of at least one wireless node in a plurality of wireless nodes    1202

Determine one or more distances between pairs of wireless nodes in the plurality of wireless nodes    1204

Generate a loss function based on possible locations of each of the plurality of wireless nodes, wherein the loss function has a low value when the possible locations are consistent with the location of the at least one wireless node and the one or more distances between the pairs of wireless nodes    1206

Determine a set of location values to minimize the loss function    1208

Output a location for each of the plurality of wireless nodes based on the set of location values    1210

*FIG. 12*

USER EQUIPMENT ASSISTED MAPPING OF ACCESS POINTS

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax®), a fifth-generation (5G) service (e.g., 5G New Radio (NR)), etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

It is often desirable to know the location of a user equipment (UE), e.g., a cellular phone, with the terms "location" and "position" being synonymous and used interchangeably herein. A location services (LCS) client may desire to know the location of the UE and may communicate with a location center in order to request the location of the UE. The location center and the UE may exchange messages, as appropriate, to obtain a location estimate for the UE. The location center may return the location estimate to the LCS client, e.g., for use in one or more applications.

Obtaining the location of a mobile device that is accessing a wireless network may be useful for many applications including, for example, emergency calls, personal navigation, asset tracking, locating a friend or family member, etc. Other short range communications technologies may be used for positioning applications when satellite positioning is limited (e.g., indoor positioning applications). For example, a mobile device may communicate with a wireless network using a short range communication technologies such as WiFi, Bluetooth® (BT), ultrawideband (UWB), millimeter wave (mmWave), etc. The accuracy of a location based on such technologies may depend on the accuracy of the locations of base stations and access points in the wireless network.

SUMMARY

An example method for determining locations for a plurality of wireless nodes in a wireless network according to the disclosure includes determining a location of at least one wireless node in the plurality of wireless nodes, determining one or more distances between pairs of wireless nodes in the plurality of wireless nodes, generating a loss function based on possible locations of each of the plurality of wireless nodes, wherein the loss function has a low value when the possible locations are consistent with the location of the at least one wireless node and the one or more distances between the pairs of wireless nodes, determining a set of location values to minimize the loss function, and outputting a location for each of the plurality of wireless nodes based on the set of location values.

Implementations of such a method may include one or more of the following features. Determining the set of locations values to minimize the loss function may include executing a gradient descent algorithm on a plurality of location values. Determining the set of locations values to minimize the loss function may include executing a genetic algorithm in combination with a gradient descent algorithm. Executing the genetic algorithm in combination with the gradient descent algorithm may include generating a plurality of candidate positions, computing a gradient descent on each of the plurality of candidate positions, selecting a subset of the plurality of candidate positions based on the gradient descent, generating one or more cross-over candidate positions based on the subset of the plurality of candidate positions, and determining whether a global minimum is realized. Selecting the subset of the plurality of candidate positions may include computing a diversity index for each pair of the plurality of candidate positions and selecting a pair of the plurality of candidate positions when the diversity index is greater than a diversity radius value. The location of the at least one wireless node in the plurality of wireless nodes may be based on a global navigation satellite system. The location of the at least one wireless node in the plurality of wireless nodes may be based on one or more signal exchanges with a terrestrial communications system. The at least one wireless node in the plurality of wireless nodes may be a mobile device. The at least one wireless node in the plurality of wireless nodes may be an access point configured to obtain the location based on a global navigation satellite system. Determining the one or more distances between the pairs of wireless nodes in the plurality of wireless nodes may be based on one or more time-of-flight measurements. The one or more time-of-flight measurements may be based on signals transmitted with a plurality of radio technologies. The plurality of radio technologies may include WiFi, Bluetooth, Ultrawideband, and New Radio Sidelink.

An example apparatus according to the disclosure includes at least one memory, at least one transceiver, at least one processor communicatively coupled to the at least one memory and the at least one transceiver, and configured to determine a location of at least one wireless node in a plurality of wireless nodes, determine one or more distances between pairs of wireless nodes in the plurality of wireless nodes, generate a loss function based on possible locations of each of the plurality of wireless nodes, wherein the loss function has a low value when the possible locations are consistent with the location of the at least one wireless node and the one or more distances between the pairs of wireless nodes, determine a set of location values to minimize the loss function, and output a location for each of the plurality of wireless nodes based on the set of location values.

Items and/or techniques described herein may provide one or more of the following capabilities, as well as other capabilities not mentioned. A mobile device may be configured to obtain a position via satellite and/or terrestrial positioning signals. The mobile device may determine a distance to one or more access points in a wireless network. The wireless network may include several access points configured to obtain distance measurements to one or more neighboring access points. The locations of the access points may be unknown. A server may be configured to obtain the location of the mobile device, the mobile device-to-AP distance information, and the AP-to-AP distance information. The server may generate a loss function based on the location and distance information. A gradient descent algorithm may be used to determine a set of possible AP locations. The gradient descent algorithm may be combined with a genetic algorithm to assist in determining a global minimum. The locations of the access points may be determined without obtaining satellite signals at each access point location. The equipment and labor costs for generating a map of access point locations may be reduced. The accuracy of indoor positioning based on the locations of the access points may be increased. Other capabilities may be provided and not every implementation according to the disclosure must provide any, let alone all, of the capabilities discussed.

BRIEF DESCRIPTION OF THE DRAWINGS

FIG. 11 is a process flow diagram of an example method for determining a global minimum for a loss function.

FIG. 12 is a process flow diagram of an example method for determining locations for a plurality of wireless nodes in a wireless network.

DETAILED DESCRIPTION

Figure 1:
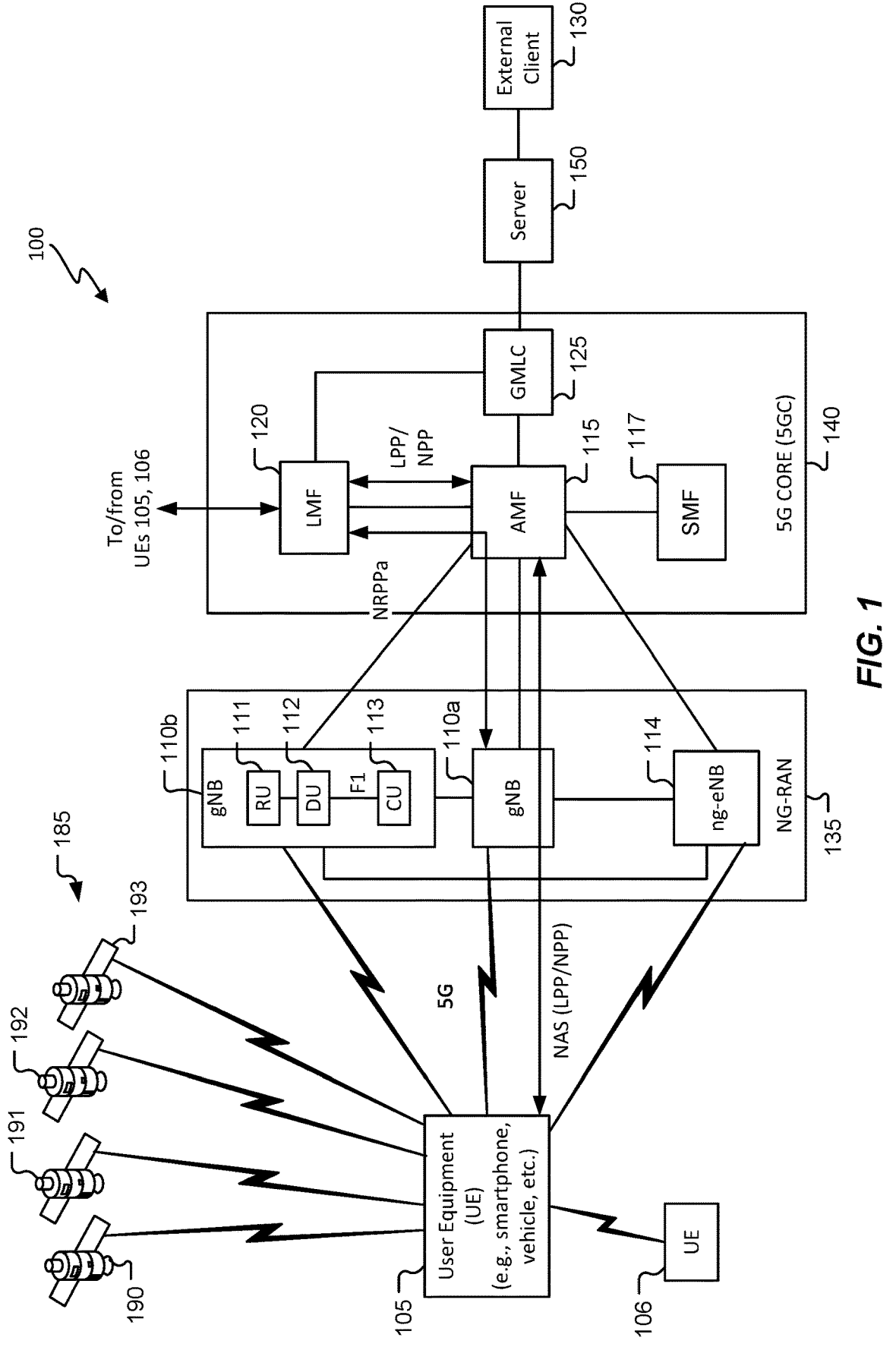
FIG. 1 is a simplified diagram of an example wireless communications system.

Techniques are discussed herein for determining the locations of wireless nodes in wireless networks. Large indoor venues (e.g., manufacturing facilities, sports arenas, shopping centers, etc.) may utilize a large number of wireless nodes such as WiFi Access Points (APs), base stations, and reference stations, for data communication and positioning applications. In some use cases, the wireless nodes may be small and portable and thus may be occasionally moved from one location to another. The users (i.e., AP owners) may desire to obtain the current locations of the wireless nodes to improve the quality of service. For example, the network administrators may utilize radio propagation tools to simulate the Wi-Fi signal strength in each location, to ensure all users will receive proper service quality, and to determine a location of the failed wireless node so that it may be replaced. Wireless nodes in Real-Time Location Systems (RTLS) may be configured to broadcast location information to mobile devices in the network to enable positioning of the mobile devices.

Existing solutions to the problem of locating wireless nodes in wireless networks typically rely on manually locating each wireless node on a map based on visual inspection. This solution, however, may be time consuming, error prone and not very accurate. Such solutions also require having access to accurate maps of the building, which is not always easy for building tenants and not practical when the wireless nodes are installed in hard to access locations. Other solutions may include adding a global navigation satellite system (GNSS) receiver to each wireless node with the hope that GNSS signals will be strong enough in all the wireless node locations. This solution may increase the cost of a wireless node, and may not be reliable when the wireless nodes are located in areas which cannot receive GNSS signals (e.g., indoors). Similar limitations exist for solutions which utilize temporary GNSS receivers placed near wireless nodes to determine a location of the wireless node.

The techniques provided herein enable mapping of multiple wireless nodes in an indoor structure. The wireless nodes, such as WiFi APs, are configured to measure time of flight (TOF) information with neighboring wireless nodes. A mobile device, such as a smartphone carried by a user, may obtain a GNSS based position while proximate to one or more of the multiple wireless nodes. The mobile device may obtain TOF information for signals exchanged with the wireless nodes. The TOF measurements (e.g., AP-to-AP, AP-to-mobile device, etc.) and the GNSS based location of the mobile device may be provided to a networked server (or received by the mobile device) configured to process the measurements and output locations for each of the multiple wireless nodes. An example algorithm for generating the locations may include building a mathematical loss function configured to generate larger values when possible locations (i.e., candidate locations) for the wireless nodes are inconsistent with the TOF measurements. The loss function may be processed with a minimization algorithm to obtain the wireless node locations. The minimization algorithm may be based on a combination of genetic algorithms with a gradient descent analysis. The locations output from the algorithm may be the candidate locations which produce minimum values in the loss function over a number of iterations. Other minimization algorithms, however, may be used to find a global minimum for the loss function.

Particular aspects of the subject matter described in this disclosure may be implemented to realize one or more of the following potential advantages. The locations of wireless nodes in a wireless network may be obtained without requiring GNSS receivers in each of the wireless nodes, or without utilizing temporary GNSS receivers with each wireless node. The techniques provided herein may be implemented when the wireless nodes cannot obtain GNSS service. The locations of the wireless nodes may be based on position measurements obtained by a single mobile device (e.g., based on GNSS or other terrestrial techniques) in combination with the node-to-node TOF measurements. The labor and costs associated with maintaining network coverage maps may be reduced. The accuracy of positioning based on the wireless networks may be increased. Other advantages may also be realized.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description herein may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various examples described herein may be embodied in a number of different forms, all of which are within the scope of the disclosure, including claimed subject matter.

As used herein, the terms "wireless node," "user equipment" (UE) and "base station" are not specific to or otherwise limited to any particular Radio Access Technology (RAT), unless otherwise noted. In general, wireless node may be a UE or a base station. A UE may be any wireless communication device (e.g., a mobile phone, router, tablet computer, laptop computer, consumer asset tracking device, Internet of Things (IoT) device, automobile, etc.) used to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi® networks (e.g., based on IEEE (Institute of Electrical and Electronics Engineers) 802.11, etc.) and so on. Two or more UEs may communicate directly in addition to or instead of passing information to each other through a network.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or another device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110*a*, 110*b*, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110*a*, 110*b* and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110*a*, 110*b*, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi®, WiFi®-Direct (WiFi®-D), Bluetooth®, Bluetooth®-low energy (BLE), Zigbee®, etc. One or more base stations, e.g., one or more of the gNBs 110a, 110b and/or the ng-eNB 114 may be configured to communicate with the UE 105 via multiple carriers. Each of the gNBs 110a, 110b and/or the ng-eNB 114 may provide communication coverage for a respective geographic region, e.g., a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections.

The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110a, 110b, the ng-CNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi® communication, multiple frequencies of WiFi® communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi® (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH). Direct wireless-device-to-wireless-device communications without going through a network may be referred to generally as sidelink communications without limiting the communications to a particular protocol.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi® (also referred to as Wi-Fi®), Bluetooth® (BT), Worldwide Interoperability for Microwave Access (WiMax®), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi® Direct (WiFi®-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g., the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The gNBs 110a, 110b and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110a, 110b and/or the ng-eNB 114 may include a radio unit (RU), a distributed unit (DU), and a central unit (CU). For example, the gNB 110b includes an RU 111, a DU 112, and a CU 113. The RU 111, DU 112, and CU 113 divide functionality of the gNB 110b. While the gNB 110b is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110b. The DU 112 hosts the Radio Link Control (RLC), Medium Access Control (MAC), and physical layers of the gNB 110*b*. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110*b*. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110*a*, 110*b* and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g., by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110*a*, 110*b* (e.g., via the RU 111, the DU 112, and the CU 113) and/or the ng-cNB 114, and/or the LMF 120. As another example, the UE 105, one or more of the gNBs 110*a*, 110*b* (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS or PRS transmissions from the gNBs 110*a*, 110*b*, and/or the ng-cNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi® AP). The UE 105 may send the measurement quantities back to the LMF 120 in an LPP or NPP message (e.g., inside a 5G NAS message) via the serving gNB 110a (or the serving ng-cNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such implementations, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi® access for the UE 105 and may comprise one or more WiFi® APs. Here, the N3IWF may connect to the WLAN and to other elements in the 5GC 140 such as the AMF 115. In some examples, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other examples, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi® APs, an MME, and an E-SMLC.

As noted, in some examples, positioning functionality may be implemented, at least in part, using the directional SS or PRS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110a, 110b, the ng-eNB 114, etc.) to compute the position of the UE.

Figure 2:
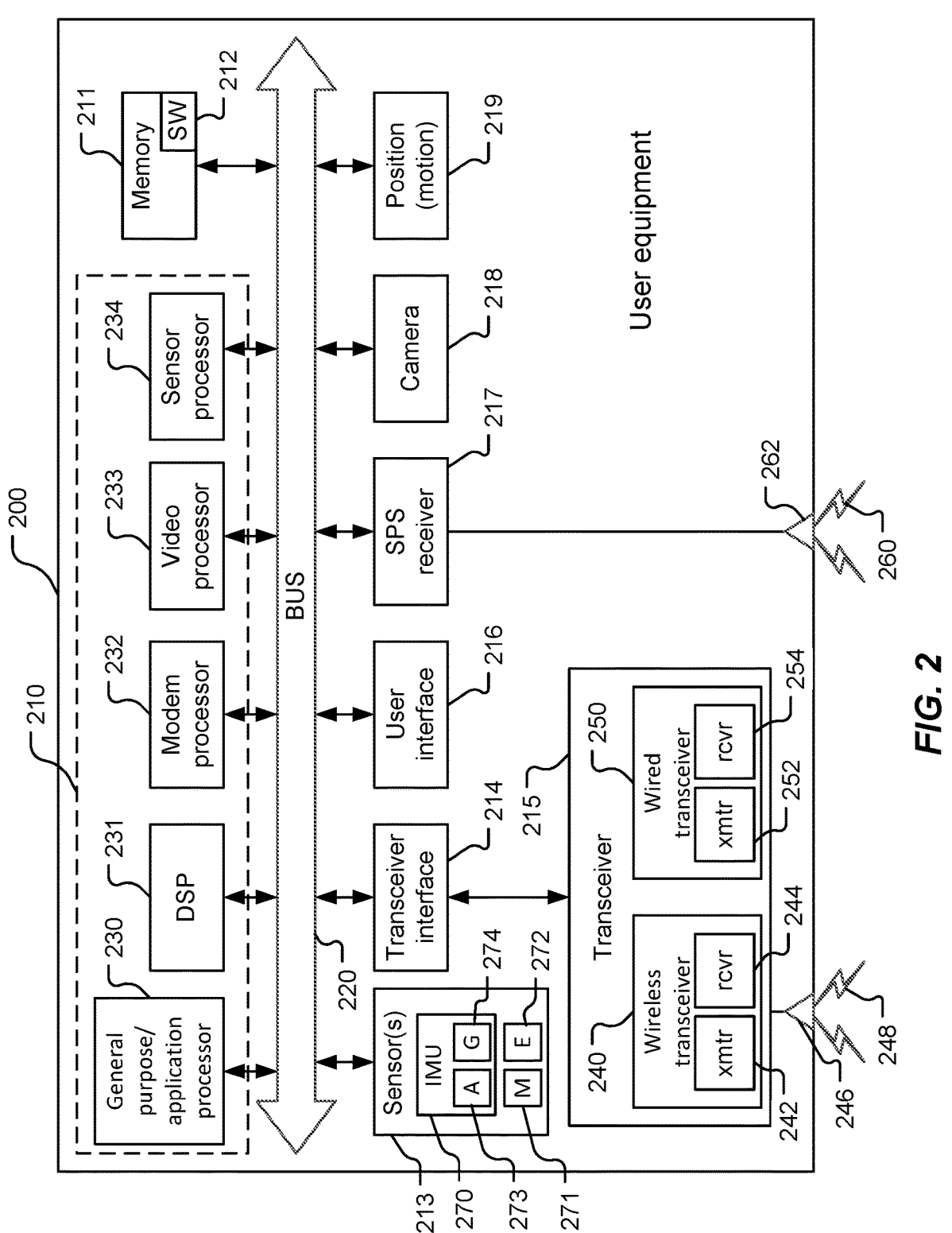
FIG. 2 is a block diagram of components of an example user equipment shown in FIG. 1.

Referring also to FIG. 2, a UE 200 may be an example of one of the UEs 105, 106 and may comprise a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 may be a non-transitory storage medium that may include random access memory (RAM), flash memory, disc memory, and/or read-only memory (ROM), etc. The memory 211 may store the software 212 which may be processor-readable, processor-executable software code containing instructions that may be configured to, when executed, cause the processor 210 to perform various functions described herein. Alternatively, the software 212 may not be directly executable by the processor 210 but may be configured to cause the processor 210, e.g., when compiled and executed, to perform the functions. The description herein may refer to the processor 210 performing a function, but this includes other implementations such as where the processor 210 executes software and/or firmware. The description herein may refer to the processor 210 performing a function as shorthand for one or more of the processors 230-234 performing the function. The description herein may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE may include one or more of the processors 230-234 of the processor 210, the memory 211, and the wireless transceiver 240. Other example configurations may include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise, for example, one or more accelerometers 273 (e.g., collectively responding to acceleration of the UE 200 in three dimensions) and/or one or more gyroscopes 274 (e.g., three-dimensional gyroscope(s)). The sensor(s) 213 may include the one or more magnetometers 271 (e.g., three-dimensional magnetometer(s)) to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations. The sensor(s) 213 may comprise one or more of other various types of sensors such as one or more optical sensors, one or more weight sensors, and/or one or more radio frequency (RF) sensors, etc.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and may report the relative displacement/distance (e.g., via dead reckoning, or sensor-based location determination, or sensor-assisted location determination enabled by the sensor(s) 213). In another example, for relative positioning information, the sensors/IMU may be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and the gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee®, etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose/application processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/application processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the wireless signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Figure 3:
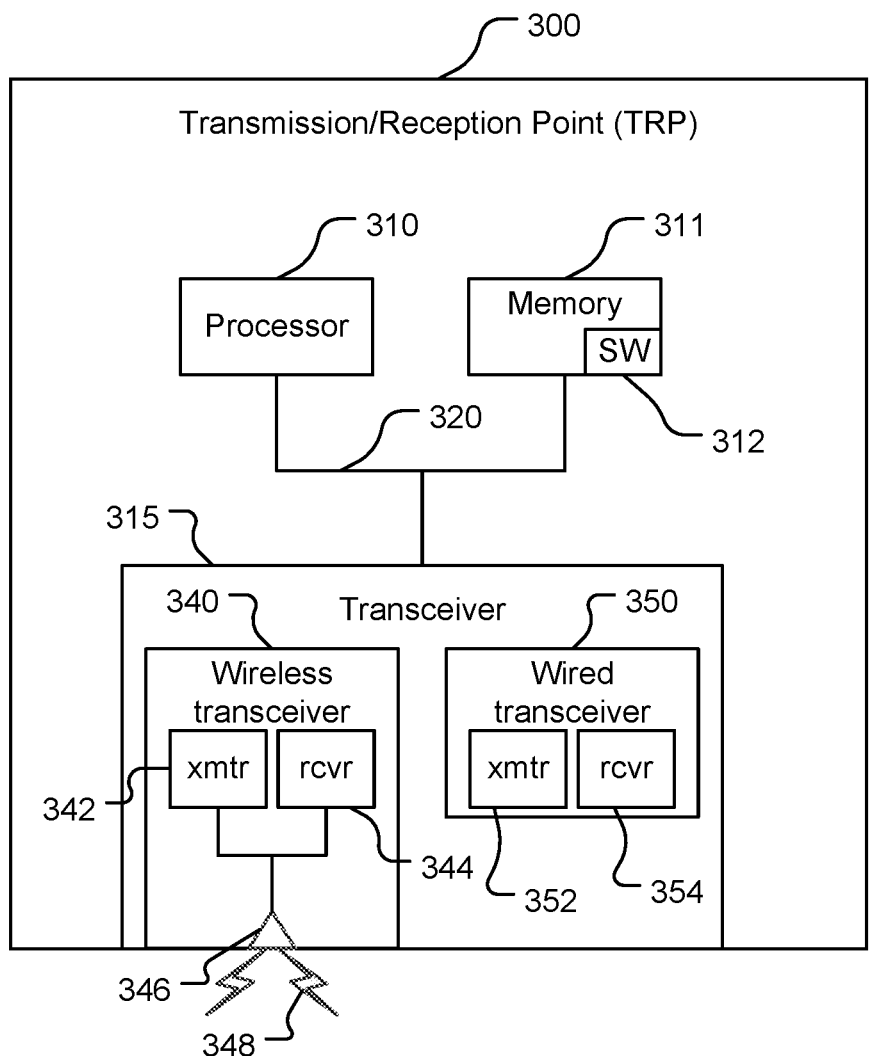
FIG. 3 is a block diagram of components of an example transmission/reception point.

Referring also to FIG. 3, an example of a TRP 300 of the gNBs 110a, 110b and/or the ng-eNB 114 is shown. In an example, an access point (AP) in a wireless network may have some or all of the components of the TRP 300. The TRP 300 may comprise a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus may be omitted from the TRP 300. The processor 310 may include one or more hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 may be a non-transitory storage medium that may include random access memory (RAM)), flash memory, disc memory, and/or read-only memory (ROM), etc. The memory 311 may store the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description herein may refer to the processor 310 performing a function, but this includes other implementations such as where the processor 310 executes software and/or firmware. The description herein may refer to the processor 310 performing a function as shorthand for one or more of the processors contained in the processor 310 performing the function. The description herein may refer to the TRP 300 performing a function as shorthand for one or more appropriate components (e.g., the processor 310 and the memory 311) of the TRP 300 (and thus of one of the gNBs 110a, 110b and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee®, etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 may be configured to perform or performs several functions, but one or more of these functions may be performed by the LMF 120 and/or the UE 200 (i.e., the LMF 120 and/or the UE 200 may be configured to perform one or more of these functions).

Figure 4:
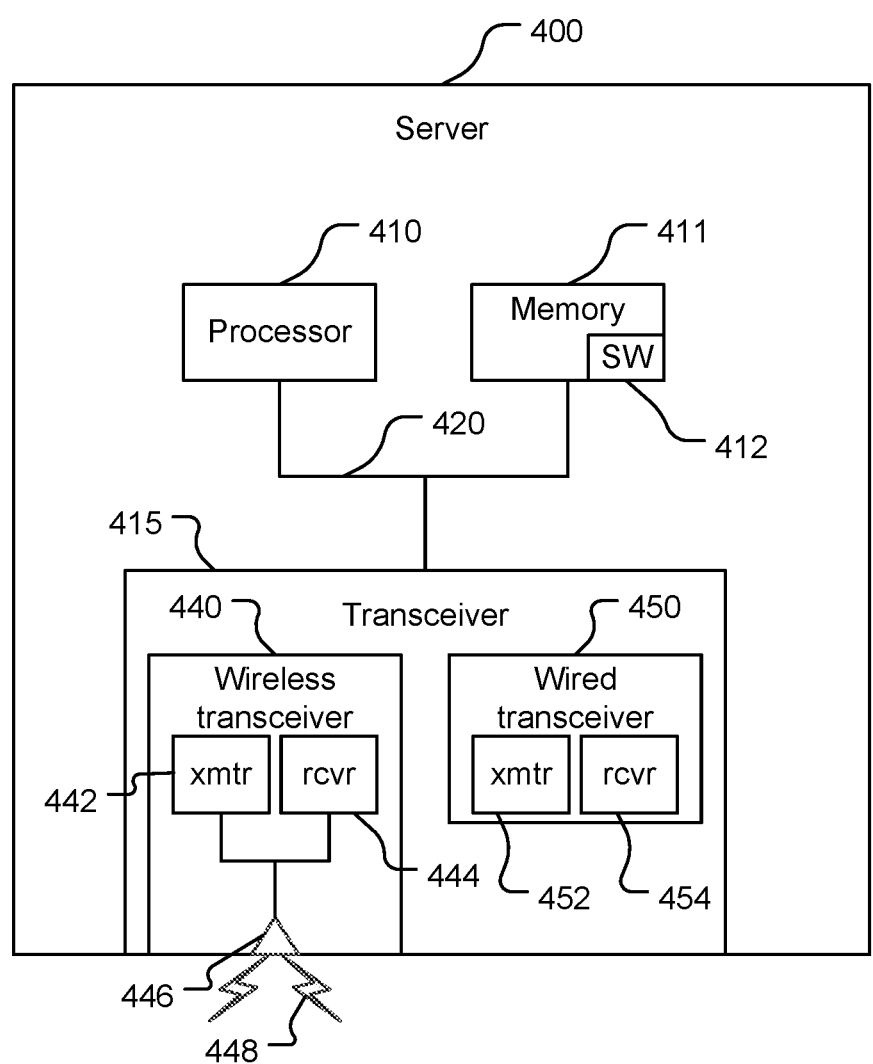
FIG. 4 is a block diagram of components of a server.

Referring also to FIG. 4, a server 400, of which the LMF 120 may be an example, may comprise a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 may be a non-transitory storage medium that may include random access memory (RAM)), flash memory, disc memory, and/or read-only memory (ROM), etc. The memory 411 may store the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description herein may refer to the processor 410 performing a function, but this includes other implementations such as where the processor 410 executes software and/or firmware. The description herein may refer to the processor 410 performing a function as shorthand for one or more of the processors contained in the processor 410 performing the function. The description herein may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee®, etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP

300 and/or the UE 200 (i.e., the TRP 300 and/or the UE 200 may be configured to perform one or more of these functions).

Figure 5:
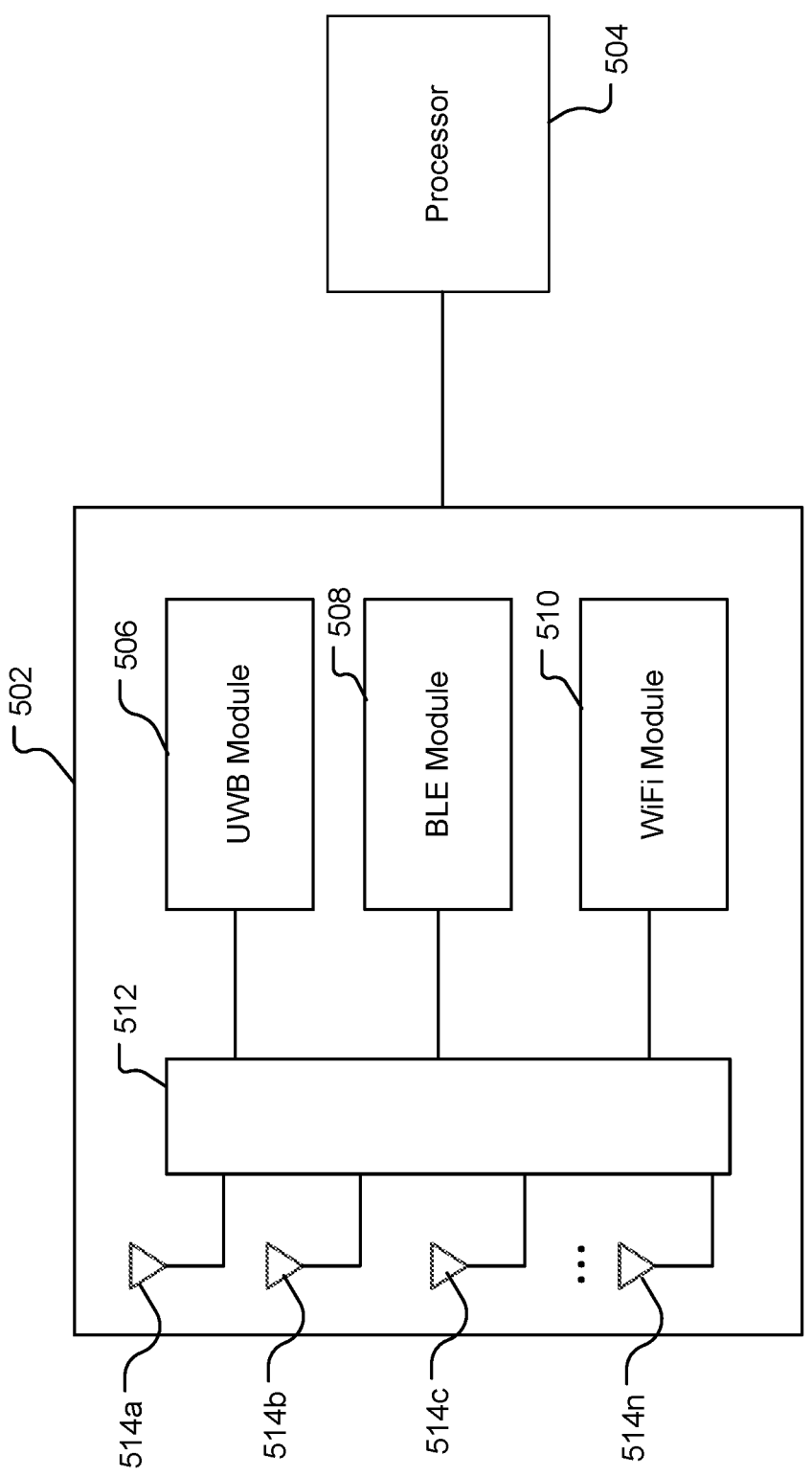
FIG. 5 is a block diagram of an example communications module with multiple transceivers.

Referring to FIG. 5, a block diagram of an example communications module 502 with multiple transceivers is shown. The communications module 502 may be used as a transceiver in a wireless node, such as the transceiver 215 in the UE 200, or a transceiver in a base station/AP, such as the transceiver 315 in the TRP 300. Other devices, such as smart tags, tables, laptop computers, etc. may have some or all of the components of the communications module 502. In an example, in a V2X network, the communication module may be included in a Roadside Unit (RSU). The communications module 502 may be communicatively coupled to a processor 504, such as the general-purpose processor 230 and/or the modem processor 232. One or more RF modules such as a UWB module 506, a BT or BLE module 508, and a WiFi module 510 may be communicatively coupled to a plurality of antennas 514a-n via one or more multiplexers 512. The multiplexers 512 may include switches, phase shifters, and tuning circuits configured to enable one or more of the RF modules 506, 508, 510 to send and receive signals via one or more of the antennas 514a-n. For example, the WiFi module 510 and the UWB module 506 may be configured to utilize one or more of the antennas 514a-n based on operational frequencies. The phase shifters, and other components within the multiplexers 512, may enable beamforming to increase the transmit or receive gain on different boresight angles from the location of the antennas 514a-n. In an example, the BLE module 508 and the processor 504 may be configured for Bluetooth® channel sounding (BTCS) which may utilized a combination of round trip time (RTT) and round trip phase (RTP) measurement techniques. BTCS may be configured to obtain angle information. One or more of the RF modules 506, 508, 510 may be configured to perform the precision finding techniques, including obtaining signals configured for distance and direction computations, as described herein.

Figure 6:
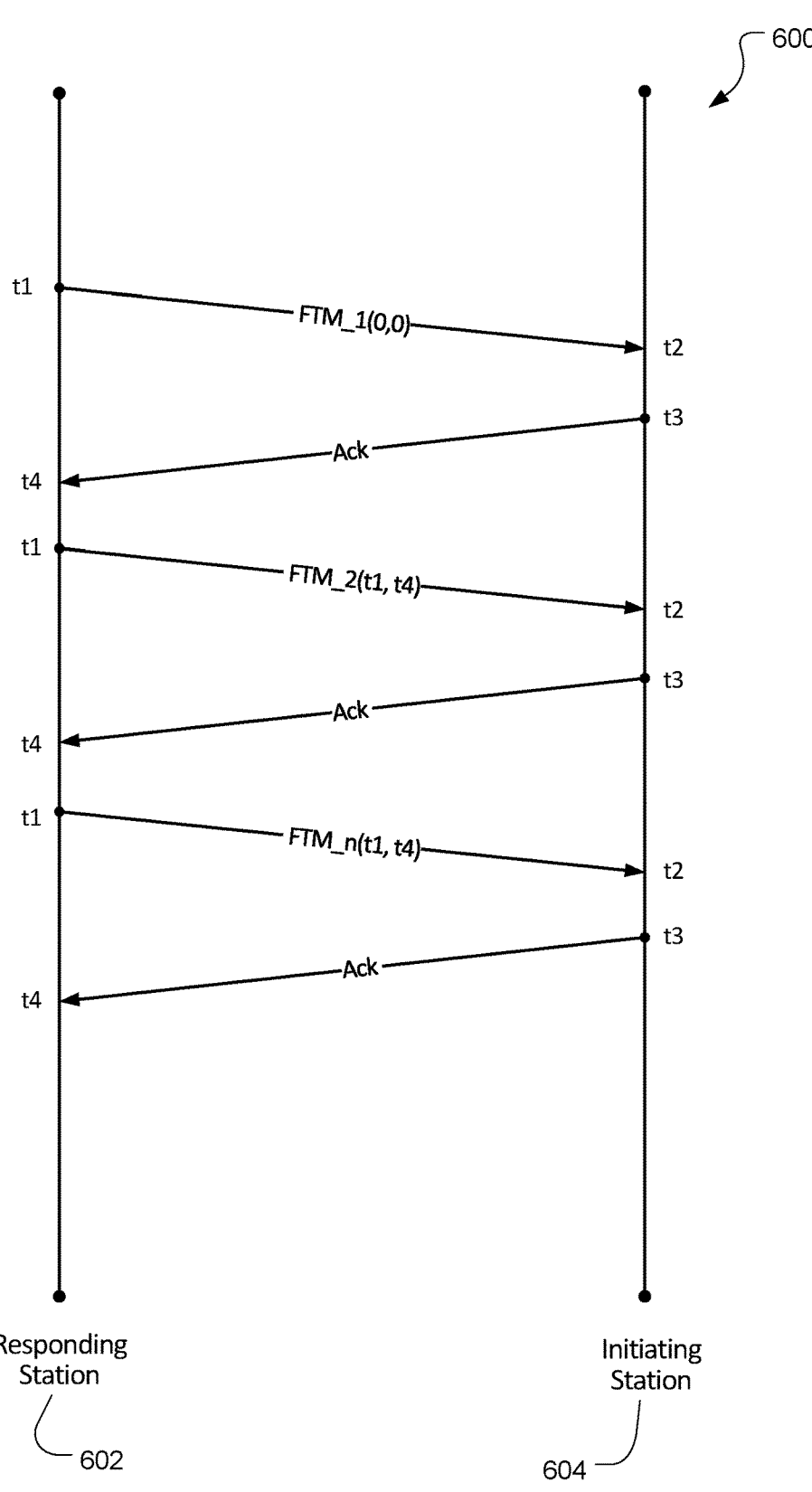
FIG. 6 is an example message flow for a round trip time measurement session.

Referring to FIG. 6, an example of a diagram of a round trip time measurement session 600 is shown. The general approach includes a responding station 602 and an initiating station 604. The responding station 602 and the initiating station 604 may be wireless nodes, such as a UE and an AP, or an AP and an AP, or other wireless devices configured to participate in time-of-flight based positioning. In an example, and not a limitation, the RTT measurement session 600 may be based on Fine Timing Measurement messages exchanged between the responding and initiating stations 602, 604. Other messages and signals such as positioning reference signals (PRS), sounding reference signals (SRS), Infra-Red camera signals, or other reference signals may be used to determine time-of-flight information between two mobile devices. The RTT measurement session 600 may utilize a FTM Protocol (e.g., 802.11mc D4.3 section 10.24.6) to enable two stations to exchange round trip measurement frames (e.g., FTM frames). The initiating station 604 may compute the round trip time by recording the TOA (i.e., t2) of the FTM frame from the responding station 602 and recording the TOD of an acknowledgement frame (ACK) of the FTM frame (i.e., t3). The responding station 602 may record the TOD of the FTM frame (i.e., t1) and the TOA of the ACK received from initiating station 604 (i.e., t4). Variations of message formats may enable the timing values to be transferred between the responding and initiating stations 602, 604. The RTT is thus computed as:

$$RTT = [(t4 - t1) - (t3 - t2)] \qquad (1)$$

The RTT measurement session 600 may allow the initiating station 604 to obtain a range to the responding station 602. An FTM session is an example of a ranging technique between the responding station 602 and the initiating station 604. Other ranging techniques such as TDOA, TOA/TOF may also be used to determine the relative positions of the two stations. Other signaling may also be used to enable a negotiation process, the measurement exchange(s), and a termination process. For example, Wi-Fi 802.11az Ranging Null Data Packet (NDP) and Trigger-Based (TB) Ranging NDP sessions may also be used.

Figure 7A:
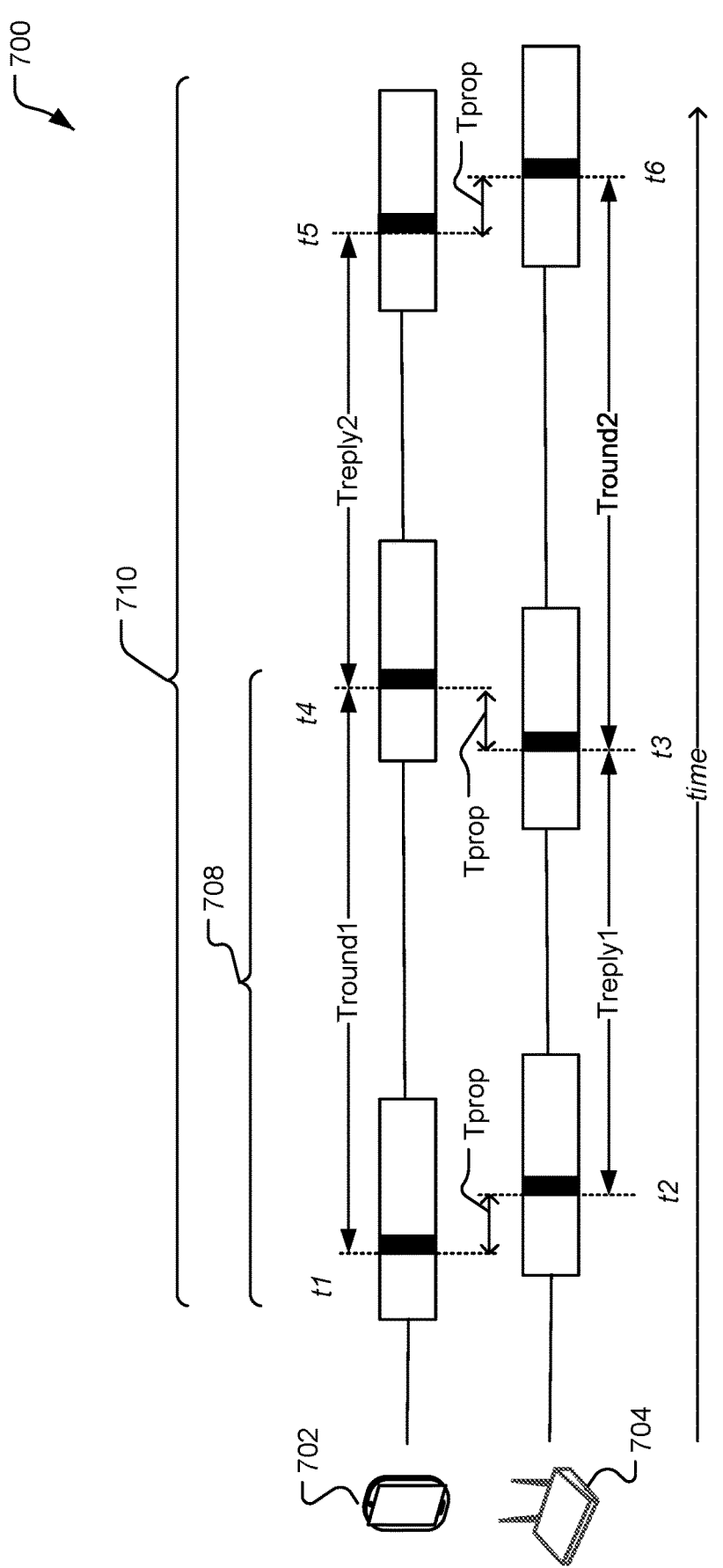
FIG. 7A is a diagram of example signal exchanges for UWB ranging.

Referring to FIG. 7A, a diagram 700 of example signal exchanges for UWB ranging is shown. The diagram 700 includes a first UWB device 702 and a second UWB device 704 (e.g., such as smartphones and/or APs in a wireless network). The UWB devices 702, 704 may include some or all of the components of the UE 200 and/or the TRP 300. In an example, the first UWB device 702 may be a UE and the second UWB device 704 may be an AP. Each of the UWB devices 702, 704 includes one or more transceivers configured to send and receive UWB signals, such as depicted in the communications module 502. The signal exchanges may be based in the IEEE 802.15.4 standard and may utilize the physical layer (PHY) and media access control (MAC) sublayers to enable secure ranging. The positioning exchanges may also utilize IEEE 802.15.4z security features such as STS in the UWB ranging frame to prevent preamble insertion attacks. In a first example, the UWB signals comprise a single-sided two-way ranging exchange 708 such that the first UWB device 702 transmits a ranging marker at time t1 which is received by the second UWB device 704 at time t2. The second UWB device 704 may send an acknowledgement frame at time t3, which is received by the first UWB device 702 at time t4. A first round time (Tround1) is equal to t4-t1, and a first reply time (Treply1) is equal to t3-t1. The second UWB device 704 may be configured to provide the Treply1 time to the first UWB device 702. The first UWB device 702 may compute a first round trip propagation time:

$$Tprop1 = Tround1 - Treply1 \qquad (2)$$

The distance between the first UWB device 702 and the second UWB device 704 is equal to:

$$distance = c * (Tprop1/2) \qquad (3)$$

where $c$ = the speed of light.

In a second example, the signals comprise a double-sided two-way ranging exchange 710 such that the first UWB device 702 will also transmit an acknowledgment at time t5 which is received by the second UWB device 704 at time t6.

The first UWB device 702 may provide a second reply time (Treply2) (i.e., t5-t4) to the second UWB device 704. The Tprop time may be computed as:

$$Tprop = ((Tround1 * Tround2) - (Treply1 * Treply2))/ \qquad (4)$$
$$(Tround1 + Tround2 - Treply1 - Treply2)$$

The propagation times (i.e., Tprop) represent the time-of-flight (ToF) of the respective signals between the UWB devices 702, 704 and may be used to determine the distance between the UWB devices 702, 704. In operation, a UWB device may be configured to determine distances up to 100-200 m with an accuracy of approximately +/−10 cm.

Figure 7B:
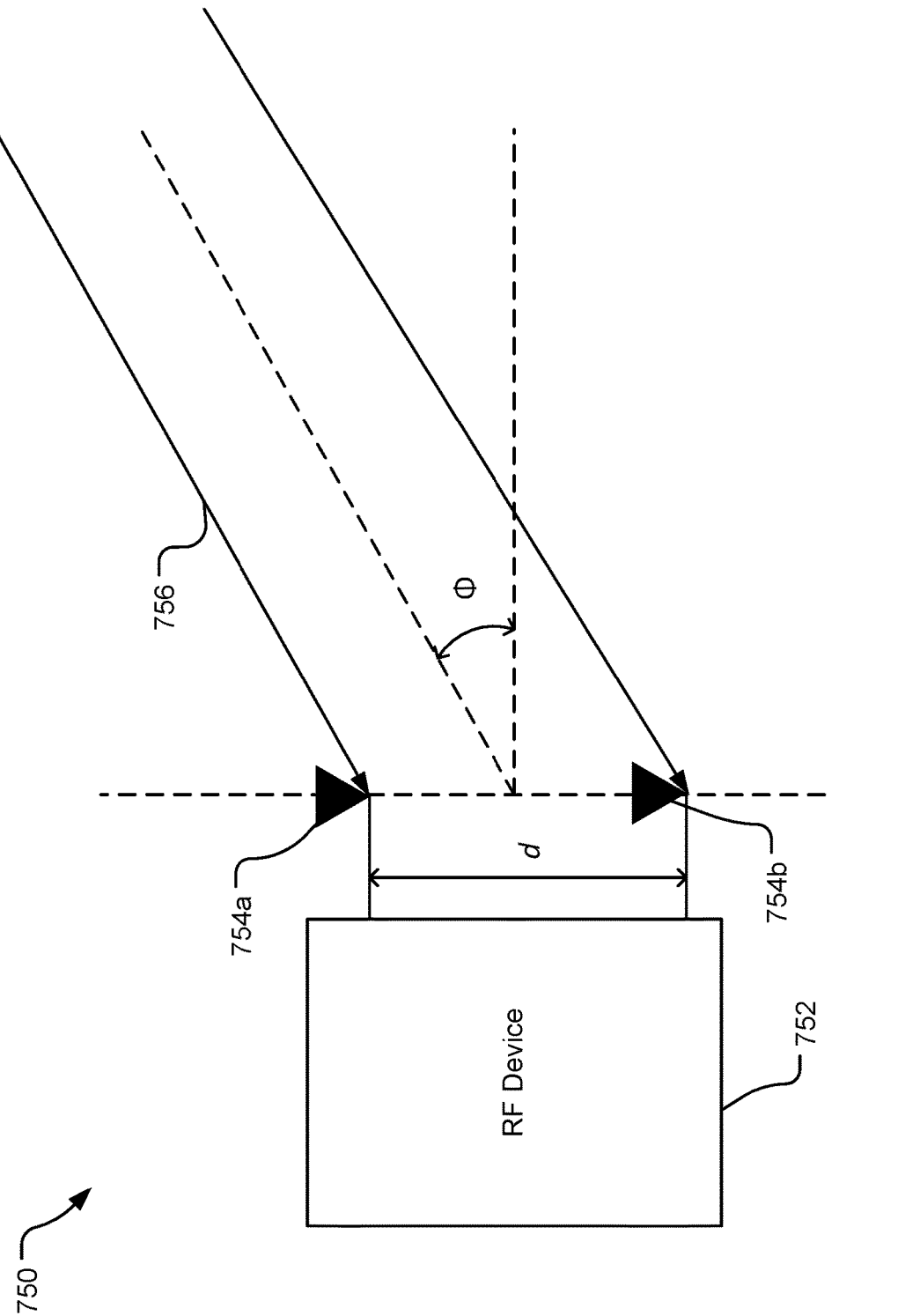
FIG. 7B is a diagram of an example angle of arrival of a RF signal.

Referring to FIG. 7B, a diagram 750 of an example angle of arrival of a RF signal is shown. The diagram 750 includes a RF device 752 (e.g., WiFi, BT, UWB, Sidelink NR, or other sidelink technology) with a plurality of antennas 754a, 754b in an antenna array. A RF signal 756 is detected at an angle of arrival (AoA) @ by the antenna array. In general, the AoA is based on a time difference between the arrival of the RF signal 756 at each of the antennas 754a, 754b in the antenna array. The time delay between the arrival of the signals may be determined as:

$$t = d * \sin\Phi/c \qquad (5)$$

where,
t is the time delay;
d is the distance between the antennas;
Φ is the AoA; and
c is the speed of light.

In operation, the RF device 752 may utilize UWB technologies and be configured to determine an AoA with an accuracy of approximately of +/−1.5 degrees. BTCS technologies may also be used to obtain AoA information. Other radio technologies and transceiver/antenna configurations may realize different accuracy results. For example, WiFi AoA measurements may be obtained with higher end wireless nodes with suitable antenna arrays.

The two-dimensional (2D) AoA measurement depicted in FIG. 7B is an example, and not a limitation. Similar procedures may be implemented with three-dimensional (3D) antenna arrays to compute an angle of elevation (AoE). In some use cases, a first radio technology may be utilized to obtain 2D AoA measurements, and a second radio technology may be utilized to obtain 3D AoA and AoE measurements. In other use cases, a first radio technology may be utilized to obtain AoA measurements for a target, and a second radio technology may be utilized to obtain the AoE measurements for the target.

Figure 8:
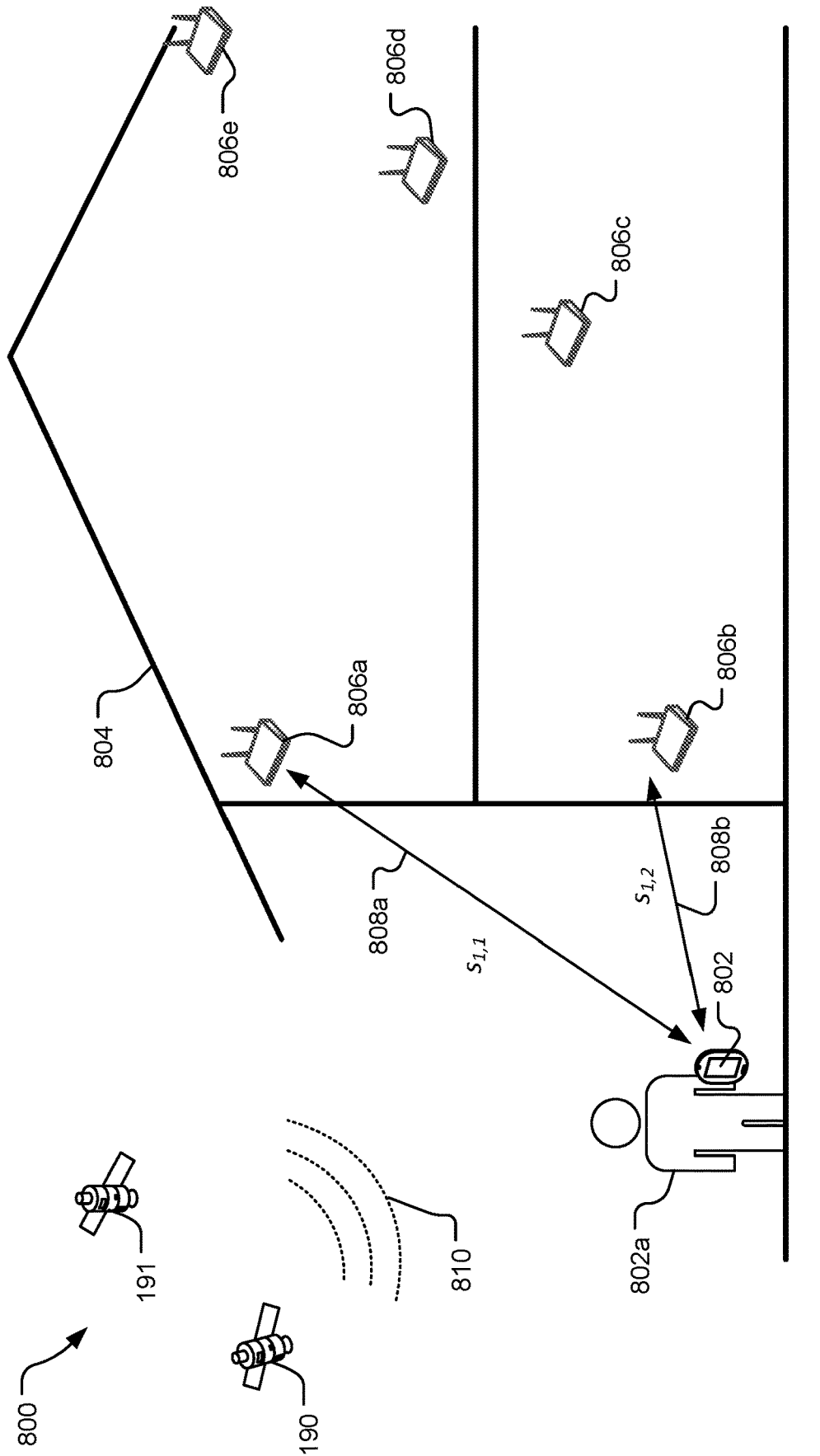
FIG. 8 is a diagram of an example use case for determining the positions of a plurality of access points from a known location of a mobile device.

Referring to FIG. 8, a diagram of an example use case 800 for determining the positions of a plurality of access points from a known location of a mobile device is shown. The use case 800 includes a UE 802 (or other mobile wireless node) and a plurality of APs 806a-806e disposed within a building 804. The APs 806a-806e may be fixed devices (FD) with unknown locations, and the UE 802 may be a mobile device (MD) configured to obtain a location based on satellite and/or terrestrial techniques. The UE 802 may be located outside of the building 804 and may be configured to compute a location based on received satellite signals 810 transmitted from one or more SVs (e.g., SVs 190, 191, etc.).

The UE 802 may be configured to determine a location based on other terrestrial techniques (e.g., via the LMF 120). In an example, a user 802a may carry the UE 802 around the outside of the building 804 and obtain range measurements to APs within the building. For example, the UE 802 may obtain TOF measurements with a first AP 806a to obtain a first range measurement 808a, and with a second AP 806b to obtain a second range measurement 808b. The TOF measurements may be based on WiFi RTT procedures (e.g., as described in FIG. 6), or other signal exchanges such as UWB (e.g., as described in FIG. 7A), or other ranging technologies such as BTCS. Each of the APs 806a-806e may be configured to obtain similar range measurements.

The APs 806a-806c (e.g. FDs) may be WiFi APs, or other wireless nodes such as UWB anchors used for UWB-based RTLS, or BLE beacons used for BLE based RTLS. The radio technology used for measuring TOF between the FDs may be Wi-Fi, UWB or BLE, or a mix of different radio technologies. The radio technology used for measuring TOF between FDs may be different than the radio technology used for measuring TOF between MDs and FDs. In an example, the mechanism used for measuring TOF distance may utilize the visible spectrum (instead of the RF spectrum) or technologies such as audio signals. Some FDs may be merged with a MD and may include a GNSS integrated in the FD. The techniques provided herein may utilize a single MD configured to move from location to location, and/or multiple MDs configured to obtain range measurements to one or more FDs. The MDs may be user transported, or may be disposed on movable devices such as drones or other types of robots configured to obtain GNSS and TOF measurements in locations which may be inaccessible to human operators (e.g., such as over the roof of a building).

Figure 9:
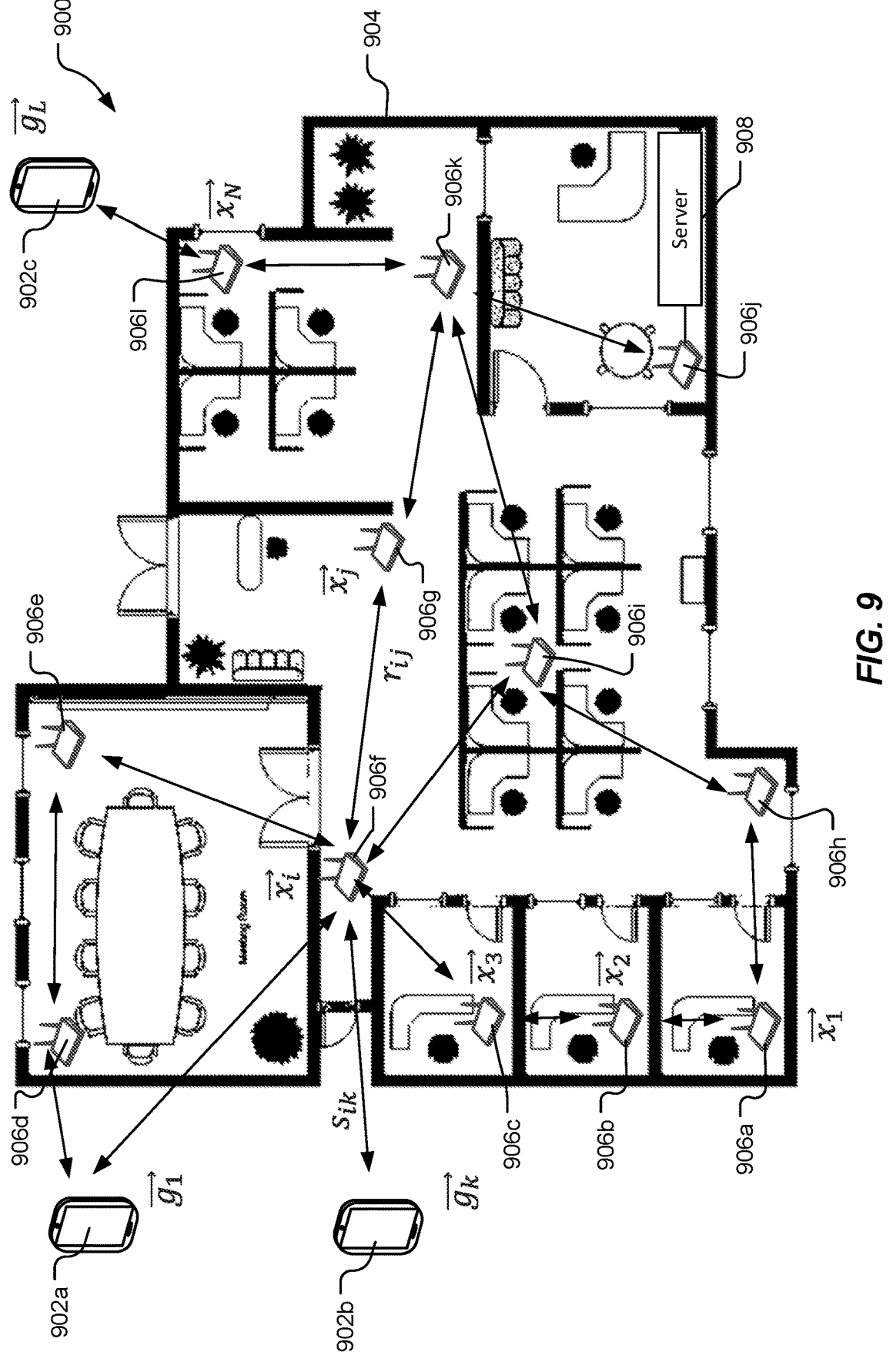
FIG. 9 is a diagram of an example use case for obtaining distance measurements between wireless nodes in a wireless network.

Referring to FIG. 9, an example use case 900 for obtaining distance measurements between wireless nodes in a wireless network is shown. The use case 900 includes a plurality of MD 902a-902c and a plurality of FDs 906a-906l disposed in a building 904. A server 908 may be communicatively coupled to one or more of the FDs 906a-906l. The MDs 902a-902c may include some or all of the components of the UE 200, the FDs 906a-906l may include some or all of the components of the TRP 300, and the server 908 may include some or all of the components of the server 400. The FDs 906a-906l are configured to measure TOF against neighboring FDs. The MDs 902a-902c may be configured to traverse through and/or around the building 904 in areas where GNSS service (or other terrestrial signaling) is available and to compute a location based on the corresponding signaling. The MDs 902a-902c may pause movement at certain locations to enable a more accurate location measurement based on the GNSS and/or terrestrial signaling. The MDs 902a-902c are configured to measure TOF distances with one or more of the FDs 906a-906l. In example, the TOF measurements (e.g., FD-to-FD, MD-to-FD) and the location information for the MDs may be obtained by the server 908, or by one of the MDs 902a-902c. In an example, a network server (e.g., the server 150 in the communications system 100) may be configured to obtain the TOF and location measurements. The server 908 (or MD or network server) may be configured to generate a loss function and estimate the locations of each of the FDs 906a-906l based on the TOF and location information.

An example algorithm to determine the loss function and estimate the locations of the FDs may include the following variables:

N The number of Fixed Devices in the network.

L The number of Mobile Device positions in the network.

$\vec{x}_l$ A 3D vector representing the position of the i-th FD, with $i \in \{1, \ldots, N\}$.

$\vec{x}$ An N×3 array with all the FD positions $\vec{x}_i$ as rows.

$\vec{g}_k$ A 3D vector representing the position of the k-th MD, with $k \in \{1, \ldots, L\}$.

$r_{ij}$ The TOF distance measured between the i-th and the j-th FD.

$s_{ik}$ The TOF distance measured between the i-th FD and the k-th MD.

$u_{ij}$ An indicator with value 1 if the i-th and the j-th FD have a valid TOF measurement.

$w_{ij}$ An indicator with value 1 if the i-th FD and the k-th MD have a valid TOF measurement.

Different values of $\vec{x}$ correspond to different possible physical arrangements of the FD in the network, with each $\vec{x}_l$ defining the 3D vector of each FD (e.g., x, y, z). The objective of the algorithm is to find the value of $\vec{x}$ that is most likely to have produced the given measurements of $\{r_{ij}\}$ and $\{s_{ik}\}$, given the known positions $\{\vec{g}_k\}$. An example algorithm utilizes the inputs N, L, $\{\vec{g}_k\}$, $\{r_{ij}\}$, $\{s_{ik}\}$ and produces $\{\vec{x}_l\}$ as an output. The algorithm may proceed in two phases: first, a mathematical loss function $\lambda(\vec{x})$ is generated and configured to take large values when $\vec{x}$ represents a physical arrangement of FDs that is inconsistent with the TOF distances in $\{r_{ij}\}$, $\{s_{ik}\}$, and small values otherwise. Second, a minimization algorithm is utilized to determine the specific $\vec{x}$ that provides the lowest possible value for the loss function $\lambda(\vec{x})$. An example, minimization algorithm may combine a gradient descent (GD) with a genetic algorithm (GA) to enable a robust GD-GA method to help distinguish between local minimums and a global minimum.

In operation, the first components of the loss function may be called floating terms because they are dependent only on the position of the FDs relative to each other, and are not dependent on the absolute positions of the FDs. Conceptually this part of the loss function would have the same value if the FDs floated away in space provided that the relative positions of the FDs did not change. Referring to FIG. 9, the i-th and j-th FDs (e.g., 906f, 906g) are separated by a TOF distance equal to $r_{ij}$. Assuming that the measurement process for the TOF distance between the i-th and j-th FD has variance $$\sigma_{ij}^2,$$

a quadratic term for the loss function may be:

$$\lambda_{ij}^F(\vec{x}) = \frac{1}{2}\left(\frac{|\vec{x}_i - \vec{x}_j| - r_{ij}}{\sigma_{ij}}\right)^2 \tag{6}$$

The above function may be designed to take the value 0 when $\vec{x}_l$ and $\vec{x}_j$ are exactly a distance $r_{ij}$ from each other, and may increase in value quadratically as the difference between both distances increases. Note that each pair of FDs may have different variances because they may be using different types of radio, or different channel bandwidths, or may be impacted by different levels of multipath. The loss function may be extended to consider all FD in the network:

$$\lambda^F(\vec{x}) = \sum_{i=1}^{N-1} \sum_{j=i+1}^{N} \lambda_{ij}^F(\vec{x}) = \sum_{i=1}^{N-1} \sum_{j=i+1}^{N} \left\{ \frac{1}{2} \left( \frac{|\vec{x_i} - \vec{x_j}| - r_{ij}}{\sigma_{ij}} \right)^2 \right\} \quad (7)$$

In practice not all (i,j) pairs of FDs may have a valid TOF measurement between them (e.g., because the FDs may be too far away from each other for the RTT protocol to operate reliably). The indicator variable $u_{ij}$ may be utilized to ensure the pairs where $u_{ij}=1$ are considered:

$$\lambda^F(\vec{x}) = \sum_{i=1}^{N-1} \sum_{j=i+1}^{N} \lambda_{ij}^F(\vec{x}) = \sum_{i=1}^{N-1} \sum_{j=i+1}^{N} \left\{ u_{ij} \frac{1}{2} \left( \frac{|\vec{x_i} - \vec{x_j}| - r_{ij}}{\sigma_{ij}} \right)^2 \right\} \quad (8)$$

The ground terms may be based on terms with values that would change if the FDs move relative to the MD. The fact that the MD are grounded in a given position ensures the loss function would change value if the FD drifted away while finding an optimal arrangement.

In operation, considering the i-th FD and the k-th MD, which are supposed to be separated by a TOF distance equal to $s_{ik}$. Assuming that the measurement process for the TOF distance has variance $$\sigma_{ik}^2,$$

a quadratic term for the loss function may be:

$$\lambda_{ik}^G(\vec{x}) = \frac{1}{2} \left( \frac{|\vec{x_i} - \vec{g_k}| - s_{ik}}{\sigma_{ik}} \right)^2 \quad (9)$$

The above function may be designed to take a value 0 when $\vec{x_i}$ and $\vec{g_k}$ are exactly a distance $s_{ik}$ from each other, and to increase in value quadratically as the difference between both distances increases.

The loss function may be extended to consider all FD and MD pairs in the network:

$$\lambda^G(\vec{x}) = \sum_{i=1}^{N} \sum_{k=1}^{L} \lambda_{ik}^G(\vec{x}) = \sum_{i=1}^{N} \sum_{k=1}^{L} \left\{ \frac{1}{2} \left( \frac{|\vec{x_i} - \vec{g_k}| - s_{ik}}{\sigma_{ik}} \right)^2 \right\} \quad (10)$$

In operation, not all (i,k) pairs of FDs and MDs have a valid TOF measurements between them, thus an indicator variable $w_{ik}$ may be implemented to ensure only the pairs where $w_{ik}=1$ are considered:

$$\lambda^G(\vec{x}) = \sum_{i=1}^{N} \sum_{k=1}^{L} \lambda_{ik}^G(\vec{x}) = \sum_{i=1}^{N} \sum_{k=1}^{L} \left\{ w_{ik} \frac{1}{2} \left( \frac{|\vec{x_i} - \vec{g_k}| - s_{ik}}{\sigma_{ik}} \right)^2 \right\} \quad (11)$$

The floating and grounded terms may be added to obtain the complete loss function:

$$\lambda(\vec{x}) = \lambda^F(\vec{x}) + \lambda^G(\vec{x}) = \sum_{i=1}^{N-1} \sum_{j=i+1}^{N} \left\{ u_{ij} \frac{1}{2} \left( \frac{|\vec{x_i} - \vec{x_j}| - r_{ij}}{\sigma_{ij}} \right)^2 \right\} + \quad (12)$$

$$\sum_{i=1}^{N} \sum_{k=1}^{L} \left\{ w_{ik} \frac{1}{2} \left( \frac{|\vec{x_i} - \vec{g_k}| - s_{ik}}{\sigma_{ik}} \right)^2 \right\}$$

The loss function defined in equation (12) may be designed such that the results will be small values when vectors $\vec{x_i}$ take values that are consistent with the measurements $r_{ij}$ and $s_{ik}$, and will result in large values when vectors $\vec{x_i}$ take values that are inconsistent with the measurements $r_{ij}$ and $s_{ik}$.

In operation, an algorithm configured to determine the most likely values for $\vec{x_i}$ may be configured to find the overall vector $\vec{x}$ that minimizes $\lambda(\vec{x})$:

$$\vec{x_0} = \operatorname{argmin}_{\vec{x}} \{ \lambda(\vec{x}) \} \quad (13)$$

$$= \operatorname{argmin}_{\vec{x}} \left\{ \sum_{i=1}^{N-1} \sum_{j=i+1}^{N} \left\{ u_{ij} \frac{1}{2} \left( \frac{|\vec{x_i} - \vec{x_j}| - r_{ij}}{\sigma_{ij}} \right)^2 \right\} + \right. \quad (14)$$

$$\left. \sum_{i=1}^{N} \sum_{k=1}^{L} \left\{ w_{ik} \frac{1}{2} \left( \frac{|\vec{x_i} - \vec{g_k}| - ik}{\sigma_{ik}} \right)^2 \right\} \right\}$$

The loss function defined in equation (12) may be non-convex and may have multiple local minima. In an example, using standard Gradient Descent (GD) algorithms may end up converging to local minima. The combination of GD and genetic algorithms (GA) described herein may be implemented to overcome the problem of local minima.

Figure 10:
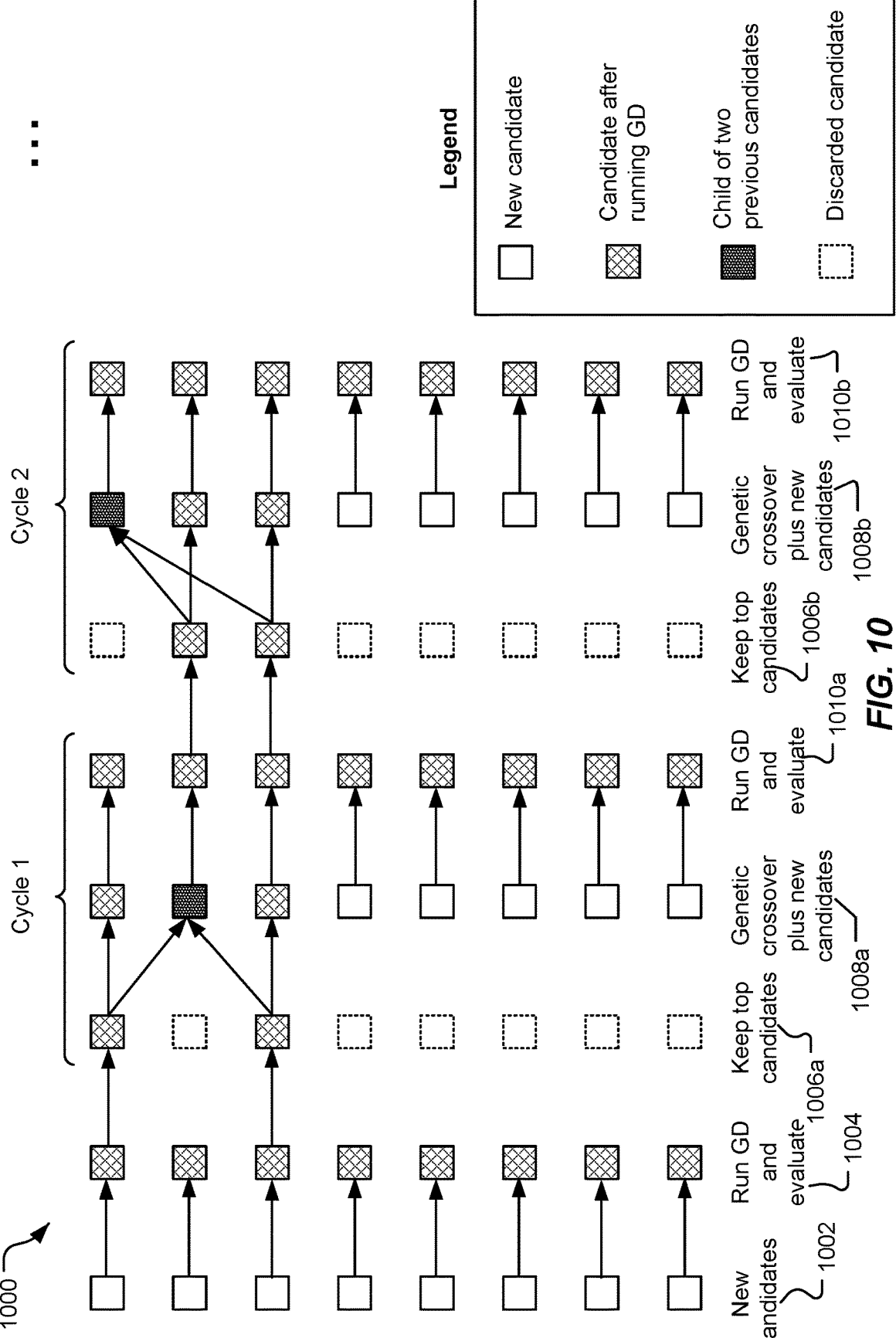
FIG. 10 is a process diagram of an example algorithm for determining a minimum value in a multivariable loss function.

Referring to FIG. 10, a process diagram 1000 of an example algorithm for determining a minimum value in a multivariable loss function is shown. The diagram 1000 is a graphical representation of how a combined GA-GD algorithm may operate. The diagram 1000 is an example, and not a limitation, as other techniques may be used to estimate a global minimum of the loss function $\lambda(\vec{x})$. The diagram 1000 illustrates an extension of GD with techniques from genetic algorithms to reduce the potential of a GD algorithm becoming stuck in a local minima.

In a first stage 1002, a pool of candidate solutions with initial positions. In an example, the pool of candidate solutions may random positions $\vec{x} \in R^{3 \times N}$. In the example, a size of the pool of candidates is G=8. In a second stage 1004, a GD is performed for a predefined number of iterations (K) with all candidates, and both the new positions $\vec{x}$ and the value $\lambda(\vec{x})$ of each candidate are stored. In a third stage 1006a, a small number (F) of candidate solutions are selected (i.e., the candidates with the smallest value of $\lambda(\vec{x})$) and the other candidates are discarded. In the example in FIG. 10, the value of F is 2. The set of selected candidates may be referred to as a survival set. In a fourth stage 1008a, new child candidates descended from the candidates that survived in the previous step may be generated. In an example, the value $\vec{x}$ of the child may be the average of the $\vec{x}$ of the parents. For example, the diagram 1000 includes two parents which may be combined (e.g., averaged) to generate a child candidate. In general, F surviving parent candidates will yield F(F−1)/2 child candidates. If the number of remaining solutions (e.g., parent candidates plus child candidates) is less than G, extra candidate solutions may be added to complete the pool. In an example, the extra candidate solutions may be randomly generated. At a fifth stage 1010a, a GD is performed for a predefined number of iterations (K) with all the new candidates, and both the new positions $\vec{x}$ and the value $\lambda(\vec{x})$ of each candidate are stored. The process may iterate for a number of cycles until a stop condition is realized. For example, a second cycle may include stages 1006b, 1008b, and 1010b which are repeats of stages 1006a, 1008a, 1010a, respectively.

A potential risk in the algorithm described in the diagram 1000 is that two surviving candidates may have similar values because both candidates are converging to the same local minimum. In such a case, there is little value in keeping both candidates and then crossing them to generate a new child candidate that will be the average of both. Computing the GD for three such candidate solutions may be a waste of computing resources since the three candidates (e.g., parent, parent, child) are essentially the same candidate. In an example, to the algorithm described in FIG. 10 may be altered by including a diversity requirement when selecting candidates for survival. For example, a diversity index may be computed for each pair of candidates in the pool and compared to a threshold value. The diversity index may be, for example, a Euclidean distance between the candidates. The candidates that are too close (e.g., within a threshold distance value) to other candidates already in the survival set may be discarded. For example, a diversity radius R may be specified, and a candidate $\vec{x_j}$ may be selected for survival if the candidate's diversity index $d_{jn}=|\vec{x_j}-\vec{x_n}|>R$, for all n already in the survival set.

A sub-algorithm may be a replacement for the third stage 1006a in each cycle of the algorithm. In an example, the sub-algorithm may include:

1. $E_k:=\{1, \ldots, G\}$ is the set of indices for candidate solutions at step k in the genetic algorithm.
2. $S_k:=\emptyset$ is the set of indices for surviving solution at step k, which is initialized as an empty set.
3. Evaluate $\lambda(\vec{x_i})$ for each candidate $x_i$, with $i \in E_k$.
4. Select the index j for the candidate with the lowest value of $\lambda()$ that is $j=argmin_{i \in \varepsilon_k}\{\lambda(\vec{x_i})\}$.
5. Remove index j from $E_k$.
6. Compute $d_{jn}=|\vec{x_j}-\vec{x_n}|$ for all $n \in S_k$.
7. If $d_{jn}>R$ for all $n \in S_k$ then add j to $S_k$.
8. If $E_k \neq \emptyset$ and $|S_k|<F$ then go back to step 4. Otherwise, end the algorithm and $S_k$ now contains the indices of all surviving candidates.

The above sub-algorithm may not guarantee that exactly F candidates will survive. For example there may be cases in which all candidates were too close to each other, in which case only one of the candidates will survive to the next generation.

The GA-GD algorithm as described in FIG. 10 may cycle until a stopping condition is realized. In an example, the genetic algorithm may be stopped when either one of the following two conditions are met: (1) the same candidate is selected as the best solution across B generations in a row; or (2) the total number of generations exceed some pre-specified maximum M.

In an example, depending on the specific arrangement of APs (e.g., FDs), or the specific positions for mobile devices (MDs), it is possible that the position of certain APs are underdetermined. For example, it is possible that even if a certain value $\vec{x_l}$ produces a minimum value for $\lambda(\vec{x})$, small changes to x' may be made which may still produce the same value of $\lambda(\vec{x})$. This may occur, for example, when one AP only has TOF measurements with two nearby APs. In this case, the AP may be moved in a contiguous circle while maintaining the same TOF distance to the other two APs. The scenario is exacerbated when the AP has TOF measurements with only a single nearby AP. In that case, the AP may move through a contiguous sphere and maintain the same TOF distance to the single nearby AP. These conditions may be detected by ensuring that each AP has TOF measurements with at least 3 nearby wireless nodes (e.g., either 3 FDs, or 2 FDs and a MD, or 1 FD and 2 MDs, etc).

In a more complex use case, each of the FDs (e.g., APs) in a wireless network may meet the criteria of having at least 3 TOF measurements to nearby devices, but a large set of the FDs lack grounding measurements from a MD, such as the scenario depicted in FIG. 9. In this use case, small variations in the value of the $\vec{x_l}$ may deliver a similar value for the loss function. This issue may be identified, in an example, by computing the Hessian of the loss function, $H=\nabla^2\lambda(\vec{x})$.

The H may be a 3N×3N symmetric matrix, and may have 3N distinct orthonormal eigenvectors, each one with a real eigenvalue. In an example, assuming $\vec{u_i}$ is an eigenvector with eigenvalue $\alpha_i$. If $\vec{x_0}$ is a minimum of $\lambda(x)$ then its gradient is zero and the following Taylor approximation may be used:

$$\lambda(\vec{x}) \approx \lambda(\vec{x_0}) + \nabla\lambda(\vec{x_0}) \cdot (\vec{x}-\vec{x_0}) + (\vec{x}-\vec{x_0})^T \cdot \nabla^2\lambda(\vec{x_0}) \cdot (\vec{x}-\vec{x_0}) = \tag{15}$$
$$\lambda(\vec{x_0}) + (\vec{x}-\vec{x_0})^T \cdot \nabla^2\lambda(\vec{x_0}) \cdot (\vec{x}-\vec{x_0})$$

If it is assumed that x is a small deviation from $\vec{x_0}$ in the direction of the eigenvector $\vec{u_i}$, then $\vec{x}=\vec{x_0}+\epsilon\vec{u_i}$, then the precision in the direction of eigenvector $\vec{u_i}$ may is given by the equivalent standard deviation $$\sigma_i = \frac{1}{\alpha_i}:$$

$$\lambda(\vec{x}) \approx \lambda(\vec{x_0}) + (\vec{x}-\vec{x_0})^T \cdot \nabla^2\lambda(\vec{x_0}) \cdot (\vec{x}-\vec{x_0}) = \tag{16}$$
$$\lambda(\vec{x_0}) + (\epsilon\vec{u_i})^T \cdot \nabla^2\lambda(\vec{x_0}) \cdot (\epsilon\vec{u_i}) =$$
$$\lambda(\vec{x_0}) + (\epsilon\vec{u_i})^T \cdot H \cdot (\epsilon\vec{u_i}) = \lambda(\vec{x_0}) + \epsilon^2(\vec{u_i}^T \cdot H \cdot \vec{u_i}) =$$
$$\lambda(\vec{x_0}) + \epsilon^2\alpha_i|\vec{u_i}|^2 = \lambda(\vec{x_0}) + \epsilon^2\alpha_i^2 = \lambda(\vec{x_0}) + \left(\frac{\epsilon}{\sigma_i}\right)^2 \text{ where } \sigma_i = \frac{1}{\alpha_i}$$

This is an example criterion for deciding whether a sufficient precision in the TOF measurements is achieved. A Hessian H with an eigenvalue $\alpha_i=0$ may be an indication that there are underdetermined positions for one or more FDs. The FDs affected by the underdetermination may be determined by inspecting which components of the eigenvector are non-zero. The non-zero eigenvectors correspond to coordinates of FDs which may be moved by a small amount with no increase in $\lambda(\vec{x})$. The algorithm may be configured to notify a user that one FD position is underdetermined and that either more measurements near that FD may be required, or that additional FDs may be required in the proximate area.

A minimum value $\alpha_{MIN}$ (or alternative, a maximum value $$\sigma_{MAX} = \frac{1}{\alpha_{MIN}}).$$

If the eigenvalues $\alpha_i$ are larger than $\alpha_{MIN}$ (or equivalently, the $\sigma_i$ values are smaller than $\sigma_{MAX}$) then the algorithm may be configured to conclude sufficient precision is realized. Otherwise, the algorithm may be configured to obtain more measurements from more MD, or to obtain more TOF measurements between the FDs to reduce the $\sigma$ of the TOF estimates.

In an example, the algorithm may be modified to accommodate different applications and boundary conditions. Information about the physical arrangement of FDs may be obtained to ensure the FDs are in a specific region in space (e.g., the z-coordinate of the FDs may not exceed a certain height based on a known height of a building). In an example, AoA information (e.g., as described in FIG. 7B) and AoD information may be measured and utilized as a boundary condition. The information of the physical arrangement may be included as extra terms to the loss function to keep solutions within the allowed boundary, which may accelerate convergence.

In some use cases, the FDs may include GNSS and/or cellular receivers and may be configured to obtain GNSS and/or terrestrial based position measurements. In such a use case, the algorithm may be configured to include the position information. In an example, the algorithm may consider such a FD as a MD and utilize the known position. In an example, the algorithm may be configured to generate a virtual MD at the known position and then create a virtual measurement with $s_{ik}=0$ between the FD and the virtual MD. This modification to the algorithm may provide the benefit of modeling the uncertainty of the measurement by using $\sigma_{ik}$, such that the FD position may be computed that is slightly different from the position information (e.g., based on the GNSS and/or terrestrial measurements).

Referring to FIG. 11, with further reference to FIGS. 1-10, an example method 1100 for determining a global minimum for a loss function includes the stages shown. The method 1100 is, however, an example and not limiting. The method 1100 may be altered, e.g., by having one or more stages added, removed, rearranged, combined, performed concurrently, and/or by having one or more single stages split into multiple stages. The method 1100 may be performed on a wireless node, such as a UE or AP, or on a networked server, configured to obtain TOF and position information from the FDs and MDs in a wireless network.

At stage 1102, the method includes generating a plurality of candidate positions. A server 400, including the processor 410 and the transceiver 415, is a means for generating the plurality of candidate positions. In an example, referring to FIG. 9, the server 908 may be configured to receive the TOF measurement and position information associated with a plurality of MDs and FDs in the wireless network (i.e., $\{r_{ij}\}$, $\{s_{ik}\}$, and $\{\vec{g}_k\}$) to generate a loss function $\lambda(\vec{x})$ as described in equation 12. Referring to FIG. 10, the plurality of candidate positions may be the pool of candidate solutions with initial positions at stage 1002. The initial positions may be based on bounding conditions or other estimates. In an example, the initial positions may be random positions $\vec{x} \in R^{3 \times N}$.

At stage 1104, the method includes computing a gradient descent on each of the plurality of candidate positions. The server 400, including the processor 410 and the memory 411, are a means for computing the GD. In an example, the GD may be performed for a predefined number of iterations (K) with the plurality of candidates, and both the positions $\vec{x}$ and the value $\lambda(\vec{x})$ of each candidate are stored.

At stage 1106, the method includes selecting a subset of the plurality of candidate positions based on the gradient descent. The server 400, including the processor 410 and the memory 411, are a means for selecting the subset of the plurality of candidates. Referring to the third stage 1006a in FIG. 10, the subset of the plurality of candidate position (i.e., the small number (F) of candidate solutions) are the candidates with the smallest value of $\lambda(\vec{x})$. The subset of the plurality of candidate positions may be referred to as a survival set.

At stage 1108, the method includes generating one or more cross-over candidate positions based on the subset of the plurality of candidate positions. The server 400, including the processor 410 and the memory 411, are a means for generating the one or more cross-over candidate positions. Referring to the fourth stage 1008a in FIG. 10, the one or more cross-over candidate positions are the new child candidates descended from the candidates in the survival set determined at stage 1106. In an example, the value $\vec{x}$ of a cross-over candidate may be the average of the $\vec{x}$ of two of the candidates in the survival set. Additional candidate solutions may be generated and added to the processing pool when the number of remaining solutions (e.g., the number of candidates in the survival set and the number of cross-over candidates) is less than a desired processing pool size (e.g., G). A GD may be performed for a predefined number of iterations with all the new candidates (i.e. survival set, cross-over candidates and the additional candidates), and both the new positions $\vec{x}$ and the value $\lambda(\vec{x})$ of each of the new candidates may be stored. In an example, the additional candidates may be random candidates.

At stage 1110, the method includes determining whether a global minimum is realized. The server 400, including the processor 410 and the memory 411, are a means for determining whether the global minimum is realized. The method 1100 may iterate until a stop condition is triggered and the candidate positions $\vec{x}$ with lowest value for the loss function $\lambda(\vec{x})$ may be determined to be the global minimum. In an example, the stop condition may be either one of the following two conditions: (1) the same candidate is selected as the best solution across B generations in a row; or (2) the total number of generations exceed a pre-specified maximum M. The candidate positions $\vec{x}$ with the lowest value for the loss function $\lambda(\vec{x})$ are most likely to include the positions of the FDs given the measurements of $\{r_{ij}\}$ and $\{s_{ik}\}$, and the known positions $\{\vec{g}_k\}$ described in FIG. 9.

Referring to FIG. 12, with further reference to FIGS. 1-10, an example method 1200 for determining locations for a plurality of wireless nodes in a wireless network includes the stages shown. The method 1200 is, however, an example and not limiting. The method 1200 may be altered, e.g., by having one or more stages added, removed, rearranged, combined, performed concurrently, and/or by having one or more single stages split into multiple stages. The method 1200 may be performed on a wireless node, such as a UE or AP, or on a networked server, configured to obtain TOF and position information from the FDs and MDs in a wireless network. In an example, the networked server may be part of a wireless wide area network (WWAN), such as the server 150 in the communication system 100.

At stage 1202, the method includes determining a location of at least one wireless node in a plurality of wireless nodes. A server 400, including the processor 410 and the transceiver 415, is a means for determining the location of at least one wireless node. In an example, referring to FIG. 9, the at least one wireless node may be a UE 200 such as one of the MDs 902a-902c at a respective location $\vec{g}_k$. The wireless node may be configured to determine a current location based on GNSS and/or terrestrial measurements. The resulting location (e.g., position estimate) may be provided to a server (e.g., the server 908, the server 150) or other wireless nodes in the network.

At stage 1204, the method includes determining one or more distances between pairs of wireless nodes in the plurality of wireless nodes. The server 400, including the processor 410 and the transceiver 415, is a means for determining the one or more distances. Referring to FIG. 9, the one or more distances include the values $r_{ij}$ measured between the FDs and the values Six measured between the MDs and the FDs. The distance measurements may be based on TOF measurements, such as described in FIGS. 6 and 7A. The TOF measurements may utilized one or more radio technologies, such as WiFi, BT, UWB, Sidelink NR, or other sidelink technologies. Some MD and FDs may be configured to obtain measurements with multiple radio technologies. Other location measurements (e.g., RSSI, RSRP, etc.) may be used. In an example, AoA and or AoD information, may be determined. The distances and other measurements may be provided to a server (e.g., the server 908, the server 150) or other wireless nodes in the network.

At stage 1206, the method includes generating a loss function based on possible locations of each of the plurality of wireless nodes, wherein the loss function has a low value when the possible locations are consistent with the location of the at least one wireless node and the one or more distances between the pairs of wireless nodes. The server 400, including the processor 410 and the memory 411, is a means for generating the loss function. In an example, the loss function $\lambda(\vec{x})$ is defined in equation (12) and is designed such that the results will be small values when vectors $\vec{x}_l$ take values that are consistent with the measurements $r_{ij}$ and $s_{ik}$, and will result in large values when vectors $\vec{x}_l$ take values that are inconsistent with the measurements $r_{ij}$ and $s_{ik}$.

At stage 1208, the method includes determining a set of location values to minimize the loss function. The server 400, including the processor 410 and the memory 411, is a means for determining the set of locations. In an example, referring to FIGS. 10 and 11, the processor 410 may be configured to execute a GA-GD algorithm to estimate a global minimum for the loss function $\lambda(\vec{x})$. The processor 410 may be configured to iterate through the GA-GD algorithm until a stop condition is triggered and the candidate positions x with the lowest value for the loss function $\lambda(\vec{x})$ is determined. The stop condition may be, for example, when the same candidate is selected as the best solution across B generations in a row, or when a total number of generations exceed a pre-specified maximum M. The candidate positions x with lowest value for the loss function $\lambda(\vec{x})$ is most likely to include the positions of the FDs the given measurements of $\{r_{ij}\}$ and $\{s_{ik}\}$, and the known positions $\{\vec{g}_k\}$ described in FIG. 9.

At stage 1210, the method includes outputting a location for each of the plurality of wireless nodes based on the set of location values. The server 400, including the processor 410 and the transceiver 415, is a means for outputting the locations. The locations for each of the plurality of the wireless nodes are the candidate positions $\vec{x}$ with the lowest value for the loss function $\lambda(\vec{x})$. Outputting the locations may include providing the locations to a location server configured to perform positioning computations based at least in part on the respective locations of the wireless nodes. In an example, the plurality of wireless nodes may receive their respective locations from the server (or other device configured to determine the global minimum).

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. Thus, reference to a device in the singular (e.g., "a device," "the device"), including in the claims, includes at least one, i.e., one or more, of such devices (e.g., "a processor" includes at least one processor (e.g., one processor, two processors, etc.), "the processor" includes at least one processor, "a memory" includes at least one memory, "the memory" includes at least one memory, etc.). The phrases "at least one" and "one or more" are used interchangeably and such that "at least one" referred-to object and "one or more" referred-to objects include implementations that have one referred-to object and implementations that have multiple referred-to objects. For example, "at least one processor" and "one or more processors" each includes implementations that have one processor and implementations that have multiple processors.

The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be config- ured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable soft- ware, such as applets, etc.) executed by a processor, or both. Further, connection to other computing devices such as network input/output devices may be employed. Compo- nents, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which com- munications are conveyed wirelessly, i.e., by electromag- netic and/or acoustic waves propagating through atmo- spheric space rather than through a wire or other physical connection, between wireless communication devices. A wireless communication system (also called a wireless com- munications system, a wireless communication network, or a wireless communications network) may not have all communications transmitted wirelessly, but is configured to have at least some communications transmitted wirelessly. Further, the term "wireless communication device," or simi- lar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communi- cation.

Specific details are given in the description herein to provide a thorough understanding of example configurations (including implementations). However, configurations may be practiced without these specific details. For example, well-known circuits, processes, algorithms, structures, and techniques have been shown without unnecessary detail in order to avoid obscuring the configurations. The description herein provides example configurations, and does not limit the scope, applicability, or configurations of the claims. Rather, the preceding description of the configurations pro- vides a description for implementing described techniques. Various changes may be made in the function and arrange- ment of elements.

The terms "processor-readable medium," "machine-read- able medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non- volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approxi- mately" as used herein when referring to a measurable value such as an amount, a temporal duration, and the like, encompasses variations of ±20% or ±10%, ±5%, or ±0.1% from the specified value, as appropriate in the context of the systems, devices, circuits, methods, and other implementa- tions described herein. Unless otherwise indicated, "sub- stantially" as used herein when referring to a measurable value such as an amount, a temporal duration, a physical attribute (such as frequency), and the like, also encompasses variations of ±20% or ±10%, ±5%, or ±0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first thresh- old value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

Clause 1. A method for determining locations for a plurality of wireless nodes in a wireless network, comprising: determining a location of at least one wireless node in the plurality of wireless nodes; determining one or more distances between pairs of wireless nodes in the plurality of wireless nodes; generating a loss function based on possible locations of each of the plurality of wireless nodes, wherein the loss function has a low value when the possible locations are consistent with the location of the at least one wireless node and the one or more distances between the pairs of wireless nodes; determining a set of location values to minimize the loss function; and outputting a location for each of the plurality of wireless nodes based on the set of location values.

Clause 2. The method of clause 1, wherein determining the set of locations values to minimize the loss function includes executing a gradient descent algorithm on a plurality of location values.

Clause 3. The method of clause 1, wherein determining the set of locations values to minimize the loss function includes executing a genetic algorithm in combination with a gradient descent algorithm.

Clause 4. The method of clause 3, wherein executing the genetic algorithm in combination with the gradient descent algorithm comprises: generating a plurality of candidate positions; computing a gradient descent on each of the plurality of candidate positions; selecting a subset of the plurality of candidate positions based on the gradient descent; generating one or more cross-over candidate positions based on the subset of the plurality of candidate positions; and determining whether a global minimum is realized.

Clause 5. The method of clause 4, wherein selecting the subset of the plurality of candidate positions includes computing a diversity index for each pair of the plurality of candidate positions and selecting a pair of the plurality of candidate positions when the diversity index is greater than a diversity radius value.

Clause 6. The method of clause 1, wherein the location of the at least one wireless node in the plurality of wireless nodes is based on a global navigation satellite system.

Clause 7. The method of clause 1, wherein the location of the at least one wireless node in the plurality of wireless nodes is based on one or more signal exchanges with a terrestrial communications system.

Clause 8. The method of clause 1, wherein the at least one wireless node in the plurality of wireless nodes is a mobile device.

Clause 9. The method of clause 1, wherein the at least one wireless node in the plurality of wireless nodes is an access point configured to obtain the location based on a global navigation satellite system.

Clause 10. The method of clause 1, wherein determining the one or more distances between the pairs of wireless nodes in the plurality of wireless nodes is based on one or more time-of-flight measurements.

Clause 11. The method of clause 10, wherein the one or more time-of-flight measurements are based on signals transmitted with a plurality of radio technologies.

Clause 12. The method of clause 11, wherein the plurality of radio technologies include WiFi, Bluetooth, Ultrawideband, and New Radio Sidelink.

Clause 13. An apparatus, comprising: at least one memory; at least one transceiver; at least one processor communicatively coupled to the at least one memory and the at least one transceiver, and configured to: determine a location of at least one wireless node in a plurality of wireless nodes; determine one or more distances between pairs of wireless nodes in the plurality of wireless nodes; generate a loss function based on possible locations of each of the plurality of wireless nodes, wherein the loss function has a low value when the possible locations are consistent with the location of the at least one wireless node and the one or more distances between the pairs of wireless nodes; determine a set of location values to minimize the loss function; and output a location for each of the plurality of wireless nodes based on the set of location values.

Clause 14. The apparatus of clause 13, wherein the at least one processor is further configured to execute a gradient descent algorithm on a plurality of location values to determine the set of locations values to minimize the loss function.

Clause 15. The apparatus of clause 13, wherein the at least one processor is further configured to execute a genetic algorithm in combination with a gradient descent algorithm to determine the set of locations values to minimize the loss function.

Clause 16. The apparatus of clause 15, wherein the at least one processor is further configured to: generate a plurality of candidate positions; compute a gradient descent on each of the plurality of candidate positions; select a subset of the plurality of candidate positions based on the gradient descent; generate one or more cross-over candidate positions based on the subset of the plurality of candidate positions; and determine whether a global minimum is realized.

Clause 17. The apparatus of clause 16, wherein the at least one processor is further configured to compute a diversity index for each pair of the plurality of candidate positions and select a pair of the plurality of candidate positions when the diversity index is greater than a diversity radius value.

Clause 18. The apparatus of clause 13, wherein the location of the at least one wireless node in the plurality of wireless nodes is based on a global navigation satellite system.

Clause 19. The apparatus of clause 13, wherein the location of the at least one wireless node in the plurality of wireless nodes is based on one or more signal exchanges with a terrestrial communications system.

Clause 20. The apparatus of clause 13, wherein the at least one wireless node in the plurality of wireless nodes is a mobile device.

Clause 21. The apparatus of clause 13, wherein the at least one wireless node in the plurality of wireless nodes is an access point configured to obtain the location based on a global navigation satellite system.

Clause 22. The apparatus of clause 13, wherein the one or more distances between the pairs of wireless nodes in the plurality of wireless nodes is based on one or more time-of-flight measurements.

Clause 23. The apparatus of clause 22, wherein the one or more time-of-flight measurements are based on signals transmitted with a plurality of radio technologies.

Clause 24. The apparatus of clause 23, wherein the plurality of radio technologies include WiFi, Bluetooth, Ultrawideband, and New Radio Sidelink.

Clause 25. An apparatus for determining locations for a plurality of wireless nodes in a wireless network, comprising: means for determining a location of at least one wireless node in the plurality of wireless nodes; means for determining one or more distances between pairs of wireless nodes in the plurality of wireless nodes; means for generating a loss function based on possible locations of each of the plurality of wireless nodes, wherein the loss function has a low value when the possible locations are consistent with the location of the at least one wireless node and the one or more distances between the pairs of wireless nodes; means for determining a set of location values to minimize the loss function; and means for outputting a location for each of the plurality of wireless nodes based on the set of location values.

Clause 26. The apparatus of clause 25, wherein the means for determining the set of locations values to minimize the loss function includes means for executing a genetic algorithm in combination with a gradient descent algorithm.

Clause 27. The apparatus of clause 26, wherein the means for executing the genetic algorithm in combination with the gradient descent algorithm comprises: means for generating a plurality of candidate positions; means for computing a gradient descent on each of the plurality of candidate positions; means for selecting a subset of the plurality of candidate positions based on the gradient descent; means for generating one or more cross-over candidate positions based on the subset of the plurality of candidate positions; and means for determining whether a global minimum is realized.

Clause 28. A non-transitory processor-readable storage medium comprising processor-readable instructions configured to cause one or more processors to determine locations for a plurality of wireless nodes in a wireless network, comprising: code for determining a location of at least one wireless node in the plurality of wireless nodes; code for determining one or more distances between pairs of wireless nodes in the plurality of wireless nodes; code for generating a loss function based on possible locations of each of the plurality of wireless nodes, wherein the loss function has a low value when the possible locations are consistent with the location of the at least one wireless node and the one or more distances between the pairs of wireless nodes; code for determining a set of location values to minimize the loss function; and code for outputting a location for each of the plurality of wireless nodes based on the set of location values.

Clause 29. The non-transitory processor-readable storage medium of clause 28, wherein the code for determining the set of locations values to minimize the loss function includes code for executing a genetic algorithm in combination with a gradient descent algorithm.

Clause 30. The non-transitory processor-readable storage medium of clause 29, wherein the code for executing the genetic algorithm in combination with the gradient descent algorithm comprises: code for generating a plurality of candidate positions; code for computing a gradient descent on each of the plurality of candidate positions; code for selecting a subset of the plurality of candidate positions based on the gradient descent; code for generating one or more cross-over candidate positions based on the subset of the plurality of candidate positions; and code for determining whether a global minimum is realized.

The invention claimed is:

1. A method for determining locations for a plurality of wireless nodes in a wireless network, comprising:
   determining a location of at least one wireless node in the plurality of wireless nodes;
   determining one or more distances between pairs of wireless nodes in the plurality of wireless nodes;

generating a loss function based on possible locations of each of the plurality of wireless nodes, wherein the loss function has a low value when the possible locations are consistent with the location of the at least one wireless node and the one or more distances between the pairs of wireless nodes;
   determining a set of location values to minimize the loss function; and
   outputting a location for each of the plurality of wireless nodes based on the set of location values.

2. The method of claim 1, wherein determining the set of locations values to minimize the loss function includes executing a gradient descent algorithm on a plurality of location values.

3. The method of claim 1, wherein determining the set of locations values to minimize the loss function includes executing a genetic algorithm in combination with a gradient descent algorithm.

4. The method of claim 3, wherein executing the genetic algorithm in combination with the gradient descent algorithm comprises:
   generating a plurality of candidate positions;
   computing a gradient descent on each of the plurality of candidate positions;
   selecting a subset of the plurality of candidate positions based on the gradient descent;
   generating one or more cross-over candidate positions based on the subset of the plurality of candidate positions; and
   determining whether a global minimum is realized.

5. The method of claim 4, wherein selecting the subset of the plurality of candidate positions includes computing a diversity index for each pair of the plurality of candidate positions and selecting a pair of the plurality of candidate positions when the diversity index is greater than a diversity radius value.

6. The method of claim 1, wherein the location of the at least one wireless node in the plurality of wireless nodes is based on a global navigation satellite system.

7. The method of claim 1, wherein the location of the at least one wireless node in the plurality of wireless nodes is based on one or more signal exchanges with a terrestrial communications system.

8. The method of claim 1, wherein the at least one wireless node in the plurality of wireless nodes is a mobile device.

9. The method of claim 1, wherein the at least one wireless node in the plurality of wireless nodes is an access point configured to obtain the location based on a global navigation satellite system.

10. The method of claim 1, wherein determining the one or more distances between the pairs of wireless nodes in the plurality of wireless nodes is based on one or more time-of-flight measurements.

11. The method of claim 10, wherein the one or more time-of-flight measurements are based on signals transmitted with a plurality of radio technologies.

12. The method of claim 11, wherein the plurality of radio technologies include WiFi, Bluetooth, Ultrawideband, and New Radio Sidelink.

13. An apparatus, comprising:
   at least one memory;
   at least one transceiver;
   at least one processor communicatively coupled to the at least one memory and the at least one transceiver, and configured to:
      determine a location of at least one wireless node in a plurality of wireless nodes;

determine one or more distances between pairs of wireless nodes in the plurality of wireless nodes;

generate a loss function based on possible locations of each of the plurality of wireless nodes, wherein the loss function has a low value when the possible locations are consistent with the location of the at least one wireless node and the one or more distances between the pairs of wireless nodes;

determine a set of location values to minimize the loss function; and output a location for each of the plurality of wireless nodes based on the set of location values.

14. The apparatus of claim 13, wherein the at least one processor is further configured to execute a gradient descent algorithm on a plurality of location values to determine the set of locations values to minimize the loss function.

15. The apparatus of claim 13, wherein the at least one processor is further configured to execute a genetic algorithm in combination with a gradient descent algorithm to determine the set of locations values to minimize the loss function.

16. The apparatus of claim 15, wherein the at least one processor is further configured to:

generate a plurality of candidate positions;

compute a gradient descent on each of the plurality of candidate positions;

select a subset of the plurality of candidate positions based on the gradient descent;

generate one or more cross-over candidate positions based on the subset of the plurality of candidate positions; and determine whether a global minimum is realized.

17. The apparatus of claim 16, wherein the at least one processor is further configured to compute a diversity index for each pair of the plurality of candidate positions and select a pair of the plurality of candidate positions when the diversity index is greater than a diversity radius value.

18. An apparatus for determining locations for a plurality of wireless nodes in a wireless network, comprising:

means for determining a location of at least one wireless node in the plurality of wireless nodes;

means for determining one or more distances between pairs of wireless nodes in the plurality of wireless nodes;

means for generating a loss function based on possible locations of each of the plurality of wireless nodes, wherein the loss function has a low value when the possible locations are consistent with the location of the at least one wireless node and the one or more distances between the pairs of wireless nodes;

means for determining a set of location values to minimize the loss function; and means for outputting a location for each of the plurality of wireless nodes based on the set of location values.

19. The apparatus of claim 18, wherein the means for determining the set of locations values to minimize the loss function includes means for executing a genetic algorithm in combination with a gradient descent algorithm.

20. The apparatus of claim 19, wherein the means for executing the genetic algorithm in combination with the gradient descent algorithm comprises:

means for generating a plurality of candidate positions;

means for computing a gradient descent on each of the plurality of candidate positions;

means for selecting a subset of the plurality of candidate positions based on the gradient descent;

means for generating one or more cross-over candidate positions based on the subset of the plurality of candidate positions; and means for determining whether a global minimum is realized.

* * * * *